United States Patent
Keller

(10) Patent No.: US 9,927,063 B2
(45) Date of Patent: Mar. 27, 2018

(54) ATTACHMENT SYSTEM FOR CONNECTION TO DOCK OR DECK POST

(71) Applicant: Rokel Enterprises, LLC, Cottleville, MO (US)

(72) Inventor: Roger J. Keller, Cottleville, MO (US)

(73) Assignee: ROKEL ENTERPRISES, LLC, Cottleville, MO (US)

( * ) Notice: Subject to any disclaimer, the term of this patent is extended or adjusted under 35 U.S.C. 154(b) by 0 days.

(21) Appl. No.: 15/250,410

(22) Filed: Aug. 29, 2016

(65) Prior Publication Data

US 2017/0059086 A1   Mar. 2, 2017

Related U.S. Application Data

(60) Provisional application No. 62/283,467, filed on Aug. 31, 2015.

(51) Int. Cl.
| | | |
|---|---|---|
| A01K 97/10 | (2006.01) | |
| F16M 13/02 | (2006.01) | |
| B63B 21/04 | (2006.01) | |
| F21V 21/112 | (2006.01) | |
| B63B 21/20 | (2006.01) | |
| F16B 2/00 | (2006.01) | |

(52) U.S. Cl.
CPC ............ *F16M 13/02* (2013.01); *A01K 97/10* (2013.01); *B63B 21/04* (2013.01); *B63B 2021/203* (2013.01); *F16B 2/00* (2013.01); *F21V 21/112* (2013.01)

(58) Field of Classification Search
CPC ........... F16M 13/02; A01K 97/10; F16B 2/00; E04G 7/14

USPC ........ 248/218.4, 230.7, 74.4, 312, 315, 674; 403/385, 386; 40/607.12
See application file for complete search history.

(56) References Cited

U.S. PATENT DOCUMENTS

| | | | | | |
|---|---|---|---|---|---|
| 2,625,354 | A | * | 1/1953 | Smith | B60T 17/046 248/56 |
| 3,069,189 | A | * | 12/1962 | Hollaender | E04G 7/14 285/188 |
| 4,566,819 | A | * | 1/1986 | Johnston | E04G 7/14 403/385 |
| 5,088,672 | A | * | 2/1992 | Neuendorf | F16B 2/06 248/218.4 |
| 6,340,059 | B1 | * | 1/2002 | Bethea | A62C 31/02 169/16 |
| 2002/0140116 | A1 | * | 10/2002 | Tharp | B01F 3/0412 261/122.1 |

* cited by examiner

*Primary Examiner* — Tan Le
(74) *Attorney, Agent, or Firm* — Lewis Rice LLC

(57) ABSTRACT

Described herein, among other things, is an attachment system for connecting other accessories to the upright structures of a boat dock, deck or related systems, said upright structures comprising at least one post, a pair of tubular portions provided for interlocking together forming a tubular sleeve for application about the post forming the upright structure, said tubular sleeve provided for securement of other accessories thereto, to accommodate affixation of the other accessories to the post forming the upright structures for the dock or deck, and to prevent the untimely disconnection of the accessory from the post during its usage or storage.

5 Claims, 27 Drawing Sheets

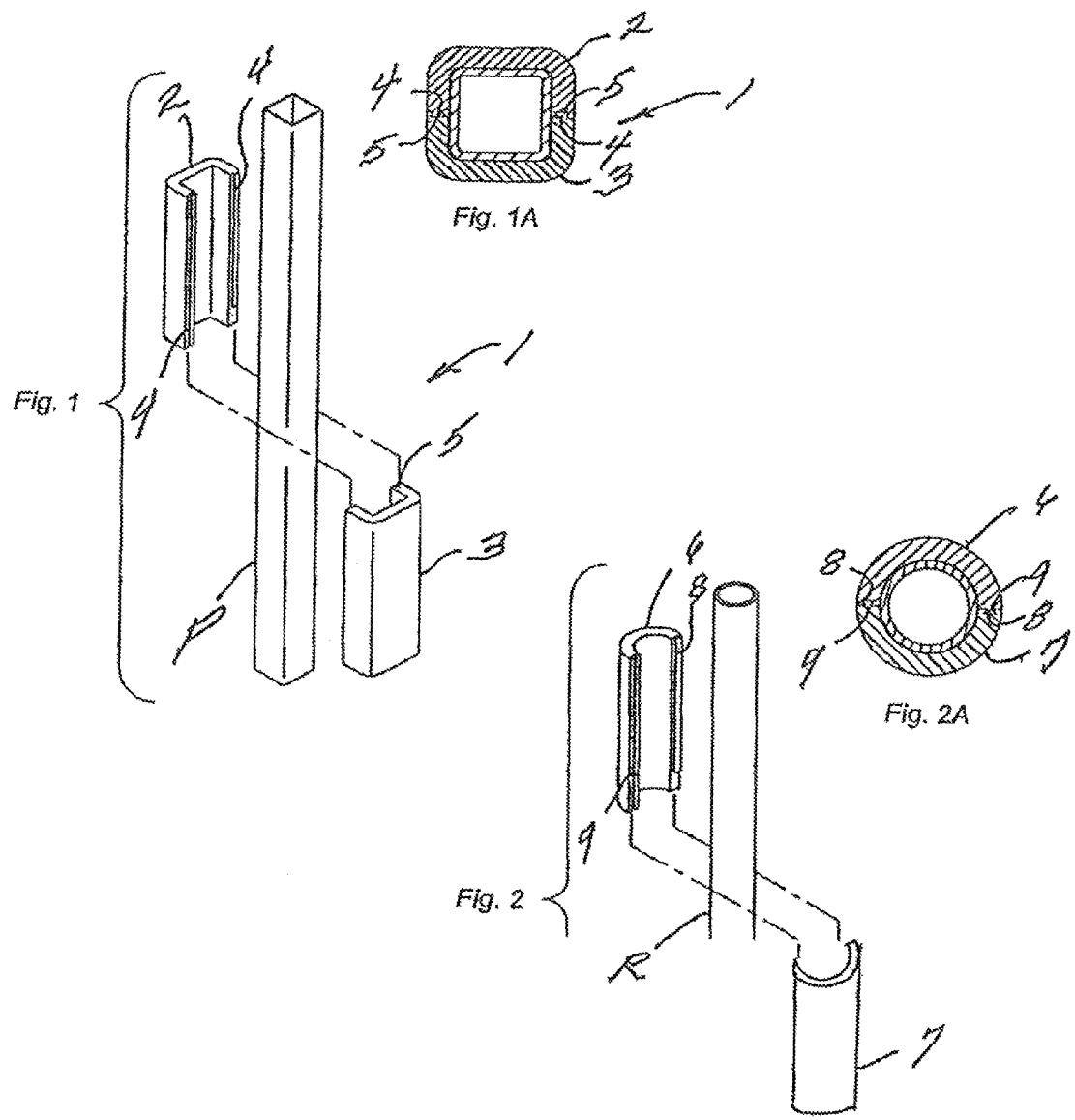

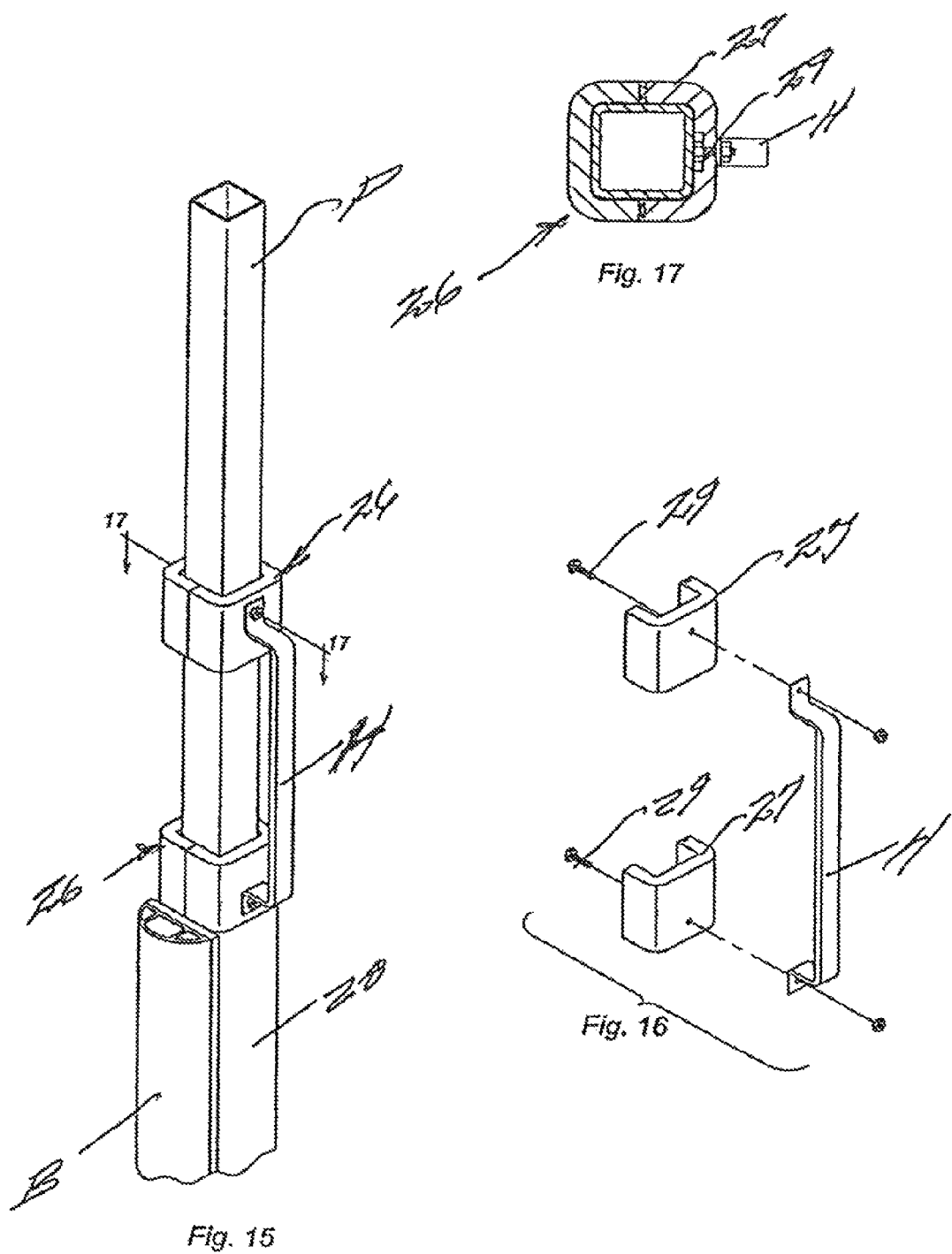

ATTACHMENT SYSTEM FOR CONNECTION TO DOCK OR DECK POST

CROSS-REFERENCE TO RELATED APPLICATIONS

This application claims benefit of U.S. Provisional Patent Application No. 62/283,467, filed Aug. 31, 2015, the entire disclosure of which is incorporated herein by reference.

BACKGROUND OF THE INVENTION

Field of the Invention

This disclosure is related to the field of secondary products for existing structures. In particular, this disclosure is related to a system that can be used to attach hardware and accessories to a pole or post that may be composed of steel, wood, or polymeric material, and furnish means for attachment of such accessories to the post on a boat dock, at a residential dock, on commercial facilities, and where it is desirable to attach certain other accoutrements to structures at such locations.

Description of the Related Art

Boat docks have had a presence on lakes and ponds for many years, however, prior to about 1980 they were simply used as a mooring place for boats. Early docks were made from logs that were strapped together with a deck put over the top of the timbers and some cleats were attached so that a boat could be tied to the dock. Eventually roofs were added to docks and boat slips were built under the roof to protect the boat and contents from the sun and bad weather. With the advent of fiberglass resins, pleasure boats became more affordable, larger and longer lived versus old style wooden boats. The number of docks and boats has grown tremendously over the past thirty years. Now large boats and large docks with multiple boat slips are commonplace on most lakes. Most docks have a swim dock, a place to sunbathe, and a place to eat and drink.

Now, boat docks also need the amenities of home, items such as a table, a trash can, a container to hold floating noodles and other things. At this time, everything on a dock is subject to going overboard due to wind, wave action, children or clumsiness on the part of an adult. With so much time being spent on the dock, permanent anchoring systems are needed to keep tables, chairs, trash cans and other necessary items in place without the fear of having them fall into the water. In addition, as new and larger lake "toys" have been introduced, such as the tube or whale that can be towed behind a boat and used to carry people, the need to store such large and bulky items has become very important.

The need to secure items to a solid support such as a post or pole on a boat dock or residential deck is understood. Items left loose on a dock or deck can be subject to being knocked over, pulled over or blown over by a variety of phenomena. In addition, items left lying about on a dock or deck can become trip hazards. These items include trash cans, small tables, chairs, life jackets, hoses, extension cords, and floating noodles. One problem in anchoring directly to a pole or post is that a hole must first be drilled in the post and the product to be attached, say a hook for example, is bolted or screwed to the post. The process of drilling holes in steel posts is often difficult and hard to accomplish.

Once a hole is drilled, it is subject to rusting. If the attached item is ever removed, a hole is left in the post, which can lead to further rust problems, and the hole itself may compromise the structural integrity of the post. There are other ways to attach products to a post on a dock, such as tying articles down by wrapping a rope or a bungee cord around a post and securing the item to it. However, this is unsightly, not convenient, and generally does not work well.

Various prior patent documents have shown structures for mooring devices to boat docks, or the like. Prior patent to Warwick, U.S. Pat. No. 4,067,283, the entire disclosure of which is herein incorporated by reference, shows a Boat Mooring Device. As noted, it discloses a device that can be secured to a pile H; it includes a plate that can be secured by chains, cables, ropes, or the like, to the pile or post, in its installation. Then, through its arms, it can hold a casing, which has a chain provided therein, and which apparently provides the chain for hooking onto the boat, and to the dock. The essence of the invention is that it simply shows a plate that can be attached to a wood pile or post.

The patent to Maudlin et al., U.S. Pat. No. 4,903,629, the entire disclosure of which is herein incorporated by reference, shows a Boat Slide Channel Assembly. This is a PVC extrusion, which incorporates a mounting base, with an upwardly projecting sidewall, as noted, which forms a groove track that apparently can hold a marine canvas, through a slide insert, and in place. The device can be connected to a deck surface. This device indicates a slide channel assembly that may be connected to a deck, for holding other accessories in place.

The patent to Jordan, III et al., U.S. Pat. No. 5,592,893, the entire disclosure of which is herein incorporated by reference, shows a Sport Fishing Outrigger Device. This particular device is an outrigger assembly, which has its central pivotal core element, and then has various plastic end caps that fit over its lower end. The end cap serves as a radial and bottom pivot bearing. There also is a plastic sleeve that is provided upon the upper part of the tube, and which incorporates various mounting brackets for use as a rotating handle for the outrigger. This device also shows various types of sleeves or collars that can be mounted onto a metal post, and even have a handle attached to it, for use during its functioning.

The patent to Burns, U.S. Pat. No. 5,746,031, the entire disclosure of which is herein incorporated by reference, shows a Wild Fire Suppressor for Utility Poles. This device is generally a base wrap, apparently made of fire-resistant material, which will install around the base of a utility pole, apparently for the purpose of keeping fire from attaining access to the pole, during its usage. This device includes various panels that can be wrapped around the utility pole, but it is more for use in keeping the area around the pole free from any grasses, weeds, or other inflammatory material, rather than functioning as a means for supporting accessories, as done with the current disclosure.

The patent to Schaefer, U.S. Pat. No. 5,848,502, the entire disclosure of which is herein incorporated by reference, shows a Removable Post Support System. This device shows a means in the form of a base that locates in the ground, or is driven into the ground, and which can support a post.

The patent to Clark et al., U.S. Pat. No. 7,575,215, the entire disclosure of which is herein incorporated by reference, shows another Support Base for Use on Decked Surfaces. It is a support base that can be used to support various types of devices from a surface that includes gaps, etc. This particular base incorporates a series of retention members, which fit through the gaps and engage the backside or underside of a deck surface, and as a variety of spring loaded means, and can support mechanisms, for use for securement of the base in place. Once inserted, the device can be used for holding fishing poles, chairs, railings, or the like, apparently onto a deck.

The patent to Lemonides, U.S. Pat. No. 7,921,792, the entire disclosure of which is herein incorporated by reference, shows an Apparatus for affixing a Dock to an Inboard Mooring Pole. This device is designed for providing a way to affix a pile or other post to a floating dock, and apparently is for use more with a floating dock, particularly where tidewater and waves may be encountered, so that the floating dock or deck can raise or lower, relative to the pile, as may be necessary. It is a grooved cylindrical sleeve that anchors the pile within and hence the floating dock, to maintain the two in position, but to allow their relative displacement, depending upon the wave action of the water.

The published application of Booth et al., United States Utility Patent Application Publication No. 2002/0040672, the entire disclosure of which is herein incorporated by reference, shows an Apparatus for Holding a Floating Vessel to a Fixed Location. It incorporates a dock post, a channel assembly, with an arm plate, that apparently can slide up and down within the shown channel, so as to allow the moored boat to shift up and down, either under wave action, or perhaps the tide, when anchored to the dock.

The published application of Harbaugh, United States Utility Patent Application Publication No. 2004/0056169, the entire disclosure of which is herein incorporated by reference, shows an Umbrella Stand. This device simply shows a complex structure of side frame members, cross braces, and an umbrella mast, for holding an umbrella in place, and even incorporates some type of a bladder that locates within the base, apparently to function as a means to be filled with ballast, to hold the umbrella in place.

The published application of Trammell et al., United States Utility Patent Application Publication No. 2004/0187758, the entire disclosure of which is herein incorporated by reference, the entire disclosure of which is herein incorporated by reference, shows a Mooring Cover and Method of Using the Same. This is a cover that apparently fits over the upper end of a pier for a dock, and the cover has a variety of pouches or pockets, and hooks, for holding various items in place, for storage, as when not in use.

The published application of Smith, United States Utility Patent Application Publication No. 2008/0022912, the entire disclosure of which is herein incorporated by reference, shows another Boat Mooring Device. This shows a device that may be secured to a vertical pylon, that incorporates a narrow vertical slit therein, and to which a floating member may be positioned upon the pylon, and incorporates a series of attachment means apparently for connecting of mooring lines, or other structural attachments, primarily for securing a boat in place. It can be noted that it includes various securing means, for securement of the floatation member in place, as to the pylon.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a sleeve comprising: a first sleeve portion generally in the configuration of a U-shape, the legs of the first sleeve portion being generally parallel to each other and each terminating at an end tapered from a maximum width at a top side to a minimum width at an opposing bottom side; a second sleeve portion generally in the configuration of a U-shape, the legs of the second sleeve portion being generally parallel to each other and each sized and shaped to define a space corresponding to the each tapered end, such that when each tapered end is inserted into the space, the first sleeve and the second sleeve form an assembled sleeve having a generally planar top surface and an opposing generally planar bottom surface.

In an embodiment, the first sleeve comprises a base wall having two side walls attached to the base wall at opposing ends to form the U-shape, the base wall having a front side disposed between the side walls and an opposing back side, and the base wall having attached thereto an attaching element.

In a further embodiment, the attaching element is configured to hold a nautical rope.

In a further embodiment, the attaching element comprises a plurality of hardware mounting points disposed on the attaching element to accommodate the mounting of a handlebar to the attaching element.

In a further embodiment, the attaching element comprises a fishing rod holder.

In a further embodiment, the attaching element is selected from the group consisting of: a trash can holder; a storage container holder; a light; a light holder; a hook; a ring; a basketball backboard; a hose holder; an electrical cable holder; a television mounting bracket; an electrical fan holder; a mounting bracket for a gate; a life jacket holder; a life ring holder; and a dock cleat.

In a further embodiment, the assembled sleeve surrounds a generally rectangular space having an open top and bottom end.

In a further embodiment, the generally rectangular space is sized and shaped to accommodate a nautical dock post.

In a further embodiment, at least one of the first sleeve portion and second sleeve portion comprises at least one ridge protruding into the generally rectangular space when the sleeve is assembled.

In a further embodiment, the spaces defined by each of the second sleeve portion legs are not tapered.

In a further embodiment, the spaces defined by each of the second sleeve portion legs are tapered from a maximum width at a top side to a minimum width at an opposing bottom side.

In a further embodiment, the maximum width of each space is larger than the minimum width of the corresponding each tapered end, and the maximum width of each space is smaller than the maximum width of the corresponding tapered end.

In a further embodiment, the tapered end is tapered at a first angle and the tapered space is tapered at a second angle.

In a further embodiment, the arithmetic difference between the first angle and the second angle is less than one degree.

In a further embodiment, the arithmetic difference between the first angle and the second angle is about one degree.

In a further embodiment, the arithmetic difference between the first angle and the second angle is more than one degree and less than two degrees.

In a further embodiment, the minimum width of each space is less than the minimum width of the tapered end.

In a further embodiment, each tapered end is disposed at an outer leg of a U-shaped interlocking element attached by an inner leg to each side wall.

In a further embodiment, each space is defined by a G-shaped interlocking element attached to each leg of the second sleeve portion.

Also described herein, among other things, is a method for attaching an object to a dock post without the use of hardware comprising: providing a dock post of a nautical dock generally in the configuration of a rectangular prism; providing a sleeve assembly comprising: a first sleeve portion generally in the configuration of a U-shape, the legs of the first sleeve portion being generally parallel to each other and each terminating at an end tapered from a maximum width at a top side to a minimum width at an opposing bottom side; a second sleeve portion generally in the configuration of a U-shape, the legs of the second sleeve portion being generally parallel to each other and each sized and shaped to define a space corresponding to each tapered end, such that when each tapered end is inserted into each space, the first sleeve and the second sleeve form an assembled sleeve having a generally planar top surface and an opposing generally planar bottom surface; placing the first sleeve portion adjacent to the dock post such that a first side of the dock post is disposed generally adjacent to the base of the first sleeve; placing the second sleeve portion adjacent to the dock post at a position above the first sleeve portion, such that a second side of the dock post opposing the first side is disposed generally adjacent to the base of the second sleeve; inserting each tapered end into each space until the first sleeve portion and the second sleeve portion form an assembled sleeve having a generally planar top and an opposing generally planar bottom; attaching an object to the assembled sleeve.

BRIEF DESCRIPTION OF THE DRAWINGS

FIG. 1 provides an exploded view showing how a pair of sleeves halves may interconnect about a post, and held by a tongue and groove connection when permanently installed;

FIG. 1A shows a cross section of the sleeve holder of FIG. 1;

FIG. 2 shows a sleeve holder of a circular design that may be located around a post, and held together, again, by a form of tongue and groove interconnection;

FIG. 2A provides a sectional view of the sleeve and post, as assembled, of FIG. 2;

FIG. 15 shows the use of a pair of sleeve portions, both upper and lower, for holding a handle to its supporting post;

FIG. 16 provides a partial exploded view of the means for connection of the handle, to its frontal sleeve portions, during their assembly to the supporting post of FIG. 15;

FIG. 17 furnishes a transverse sectional view through the sleeve portions taken along the line 17-17 of FIG. 15;

DESCRIPTION OF THE PREFERRED EMBODIMENT(S)

Figure 4:
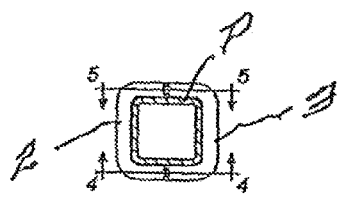
FIG. 4 provides a transverse sectional view of the assembled sleeve holder upon its post of FIG. 3.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

This disclosure contemplates various types of attachments that may be connected preferably to the upright posts on a boat dock, amongst other structures, and then may have other accessories connected to the attachments, to add to the usefulness of the device. Essentially, the basic structure includes a pair of u-shaped channels, which have a tongue and groove attachment at their ends, as noted. This allows the two half sleeves to be mated and connected together, around a square post or a round post for a boat dock, deck, or the like, or even upon a residential deck, where such is desired. The sleeves may both be u-channels, and then have a mating other half, or may simply have a slide cover, to connect the two together. Then, various types of grab bars, hooks, handles, cabinets, waste receptacles, or even a half or full table, can be connected to the sleeves, and provide for a quick attachment for these accessories, to the dock post, when installed. Essentially, this eliminates the need to drill holes into the wood or metal dock post, or deck post, which would generally weaken them through rust or corrosion, if metal, or rotting, if wood.

These sleeves can be used at a dock to provide a storage net, higher up, to provide shelter, or may have boat bumpers connected to them, so that at least one half of the sleeve can extend down along the side of the dock, with a soft rubber bumper connected to it, to act as just that, a boat bumper.

As will be understood, the primary applications are for connecting to posts on a boat dock, on a deck on a commercial residence, or commercial decks, where it is desirable to attach certain attachments at select locations. The device uses a tongue a groove attachment mechanism to hold itself in place as it encapsulates the post or pole to which it has been applied. A variety of applications has been identified, and will be subsequently described herein, in view of the drawings. In many instances, the installation process will involve posts that may have a boat bumper attached to the water side of a post, or the attachment piece is short, and will be used for attachment of a trash can or other container to the post. Alternatively, a cabinet or some other accessory can be connected thereto. And, the complete sleeve will have means to prevent their slipping into un-attachment, once they are connected together around a post, for holding an accessory in place. For example, a small stainless screw or other stop could be placed in the bottom of the groove of one of the pieces to prevent them from separation, once installed. Furthermore, the bottom of the tongue on a first piece may be milled off so that the pieces fit flush at both their top and bottom ends.

A minimum of at least twenty different useful items can be attached to a post on a dock/deck have been identified using the system described. The system being described answers all of the needs for keeping things in place. In addition, it allows for more useful items to be attached on a semi-permanent basis. A variety of convenience and safety related items can be attached to posts very simply using the system. The system attaches those items that are needed and used routinely on docks and decks in such a way that they are permanently attached and will never be lost overboard. The system is simple to use, it allows items to be attached securely, yet they can be moved and repositioned by merely lifting one half of the u-channel and removing the other half to which the item is attached and relocating to another pole of location and then reattaching the two halves back together.

Figure 18:
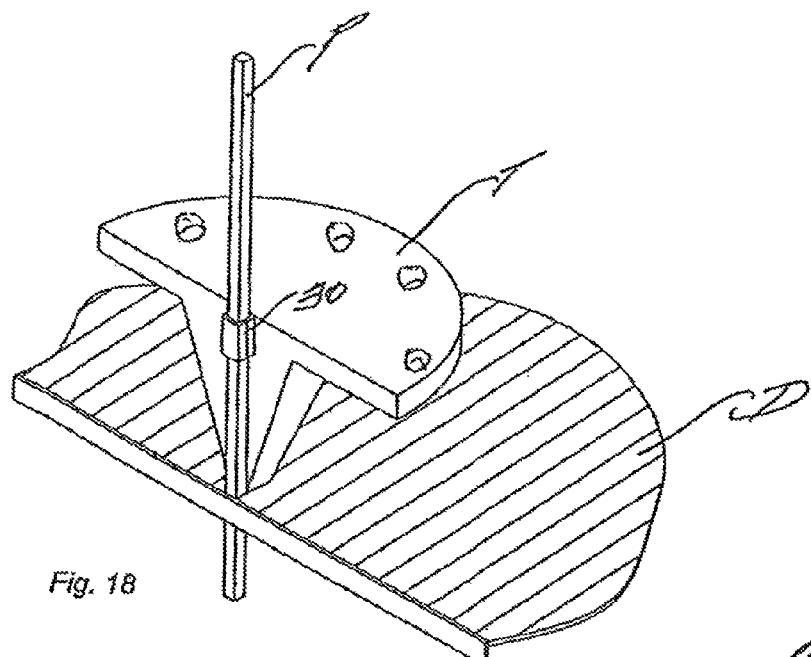
FIG. 18 shows the means for connection of a half table through the use of the sleeve portions to the supporting post of the boat dock or deck.
Figure 19:
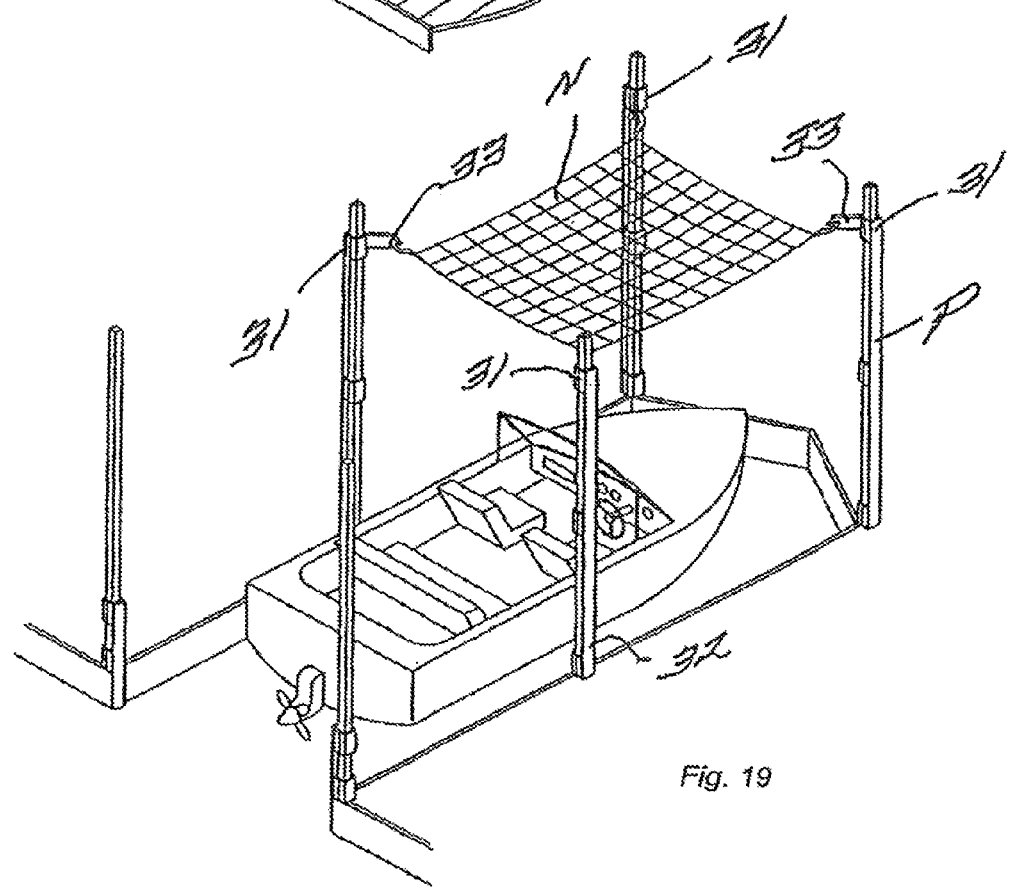
FIG. 19 shows the usage of the various sleeve portions, elevated above a boat, for holding a netting or suspended storage area for holding boating and other aquatic accessories upon a dock.

To allow for the storage of larger items, the system permits the placement of a storage net to be put above the boat slip or walkway, see FIG. 19. The storage net allows these large and bulky items to be stored out of the way. As can be appreciated, floating noodles are rather cumbersome and hard to store and keep in one location. The system allows for the placement of a series of rings attached to a post, see FIG. 25, that are then used for storing up to ten noodles, and keeping them in place. Other items that can and will be attached include, (a) a half table, see FIG. 18, (b) a lotion storage cabinet, see FIG. 13, (c) a utility cabinet, see FIG. 14, that can also double as a fishing rod storage cabinet, (d) a boat bumper tie up that allows for holding a boat bumper in place merely by inserting a rope holding a bumper into an eye and tying a simple overhand knot to hold the bumper in place, see FIGS. 26-28, (e) grab handles, see FIGS. 15-17, to allow people to get in and out of their boat safely and easily, (f) a hook system to hold towels, bags, lifejackets or life rings and or life poles, see FIG. 20, which will lead to a more convenient and safer dock environment.

Figure 22:
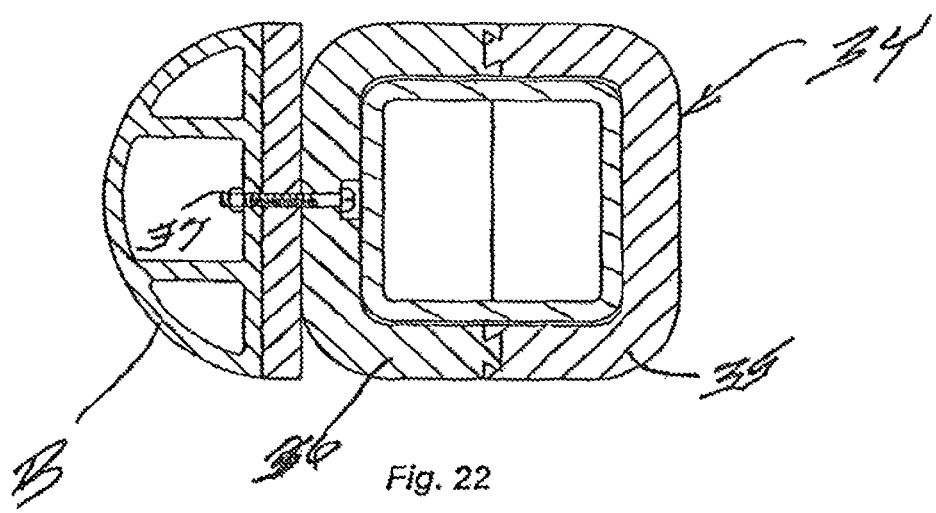
FIG. 22 provides a transverse sectional view of the upper sleeve portions of FIG. 21, taken along the line 22-22 or FIG. 21.
Figure 21:
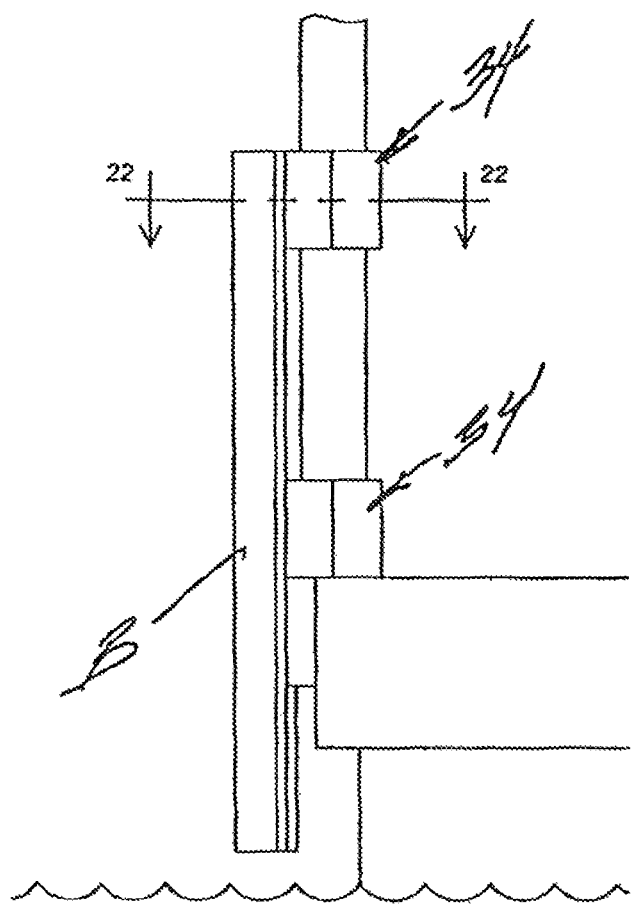
FIG. 21 provides a side view of one of the connecting sleeve portions secured to a post and holding a boat bumper in place.

Lastly, most dock bumpers used today are hard and are anchored by screwing them to a dock post using self tapping screws from the lake side. They are easily distorted if hit and do not return to their original shape. They are designed with square corners such that they can be knocked loose by being run into on a continued basis. Once a screw breaks off, the repair is troublesome. The dock bumper system shown, see FIGS. 21-22, is easy and simple to install. It is designed to keep boats safe by not allowing them to hit the bumper squarely. If the boat does hit the bumper, they are projected away from the bumper instead of merely taking a hit. The system will keep boats from riding up under the new bumpers, as they will be close to the water surface thereby not allowing the boat to ride under the bumper in the event that large waves are present. The system uses a simple locking piece that includes a dovetail tongue and groove attachment. No screws are used and they are easy to replace if the need arises. They are simple, economical and foolproof to use. This appliance utilizes a design that is intended to prevent boats from making direct contact with docks and dock poles and sustaining damage to the boat or dock proper. The bumper is manufactured from a high density polyethylene (HDPE) material that will behave as a shock absorber. The design of the bumper is such that it wraps around a 2½ inch dock pole and rests on the deck of the dock and is held in place by a unique dovetail tongue and dovetail groove locking mechanism. This bumper can be relocated or replaced very simply by someone located on the dock itself, while other bumpers that now exist are screwed into the dock poles from the lake side, meaning one must be in a boat to replace or remove a broken or damaged bumper. In addition, a unique universal corner bumper that will function for both left and right outside corners is described herein which is manufactured from materials already mentioned and which also utilizes the unique dovetail tongue and groove locking mechanism.

There is included in an embodiment a connecting means, in the form of a sleeve, that can be used to install handles, hold trash cans, provide a fishing rod holder, provide a nest for holding noodles or other swimming accessories, furnish a flagpole holder, a cabinet for holding supplies, bag/lifejacket hooks, gate attachment means, a life ring holder, a life pole or hook holder, a dock bumper holder, a hose holder, a table holder, chair catch holder, even a TV holder, a fan holder, an eyelet or hook holder, an electric extension cord holder, a buoy holder, and a means for holding any other accessories that are normally used around a boat dock, or other deck facilities.

In referring to the drawings, and in particular to FIGS. 1 and 1A, therein is shown the attachment system (1) for installation upon boat docks or other upright structures, such as the deck of a home or business establishment. The attachment system includes a pair of sleeve portions (2) and (3), with one of the portions, in this instance (2), having an integral tongue segment (4) formed along its free edge, while the sleeve portion (3) includes a series of grooves, as at (5), so that two sleeve portions may be slid together and held into a tubular construction, for surrounding the post (P) of a dock, or other structure. The sleeve portion (3) may contain the tongues, and the sleeve portion (2) may contain the grooves, for providing for their interconnection into the tubular form, when assembled, as shown in FIG. 1A. Furthermore, each sleeve portion may have a tongue (4) along one free edge, and a groove (5) upon an opposite free edge, and mate correspondingly with the other sleeve portion for securement of the two sleeve portions together, into the configuration as shown in FIG. 1A. Essentially, the concept provides a means for securement of a tubular sleeve element about a post, and its interconnection to provide for its surrounding of a post, and to be held thereto, without the need of any screws, bolts, nails, or other fasteners. Once the sleeves are located in place, then other accessories can be attached thereto, in the manner as previously summarized.

With respect to FIG. 2, it shows the same configuration for sleeve portions for surrounding a post, and being secured thereto, but in this particular instance, it surrounds a round post, rather than a square post, as previously described. In this instance, the round Post® may be used upon a boat dock, deck, or other structure. It can be permanently installed upright, and usually, there will not be a free upper end for the post to slide a sleeve thereover, since there may be a roof, or other structure provided at the post upper end, that benefits from the use of a pair of sleeve portions (6) and (7), which are generally semicircular in shape, and can be secured together through the application of its integral tongue and grooves, as noted at (8) and (9), respectively, in the manner as previously described with respect to the embodiment as shown in FIG. 1.

Figure 3:
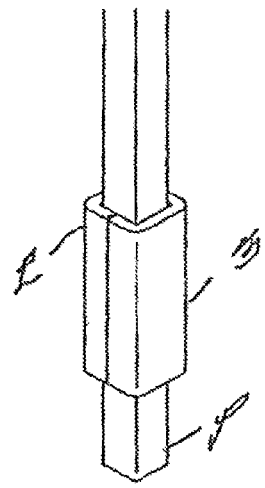
FIG. 3 shows an isometric view of the sleeve holder assembled and held upon its associated post.

FIG. 3 shows sleeve portions (2) and (3) assembled by their tongue and groove connection about the post (P), as disclosed in this isometric view. FIG. 4 shows a similar type of cross-sectional view of the sleeve portions (2) and (3), assembled about a post (P), secured together by means of a tongue and groove interconnection. As can be noted in FIG. 5, which is a view taken along the sectional line (5-5) of FIG. 4, at the bottom end of the sleeve portions (2) and (3) there may be provided a screw (10). The purpose of the screw is to prevent the sleeve portions from sliding beyond each other, as they are assembled and slid together, into interconnection, for forming the type of tubular sleeve as shown in FIG. 3. Or, in the alternative, the tongue portion of the sleeve portions may end slightly above the bottom, and the grooves may also end a corresponding distance upwardly from the bottom, so that when the two are interconnected together, they are locked into alignment, as shown in FIG. 3, and neither portion will slide further from the other, once they are aligned and installed, as noted.

Figure 7:
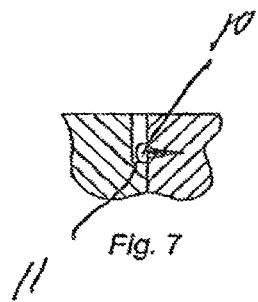
FIG. 7 provides a larger view of the holding screw as noted along line 7-7 of FIG. 5.

FIG. 7 shows the location of the screw (10) provided at the bottom of one of the sleeve portions, and it biases against a notch (11) at the opposite sleeve portion, so as to prevent the sleeves from sliding past one another.

Figure 8:
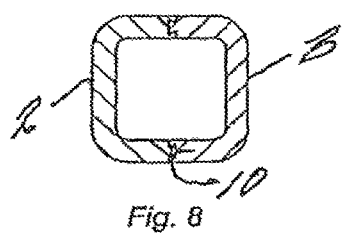
FIG. 8 shows the location of a single screw for aligning the sleeve portions about, in this instance, a square post, generally of the type as shown in FIG. 3.
Figure 5:
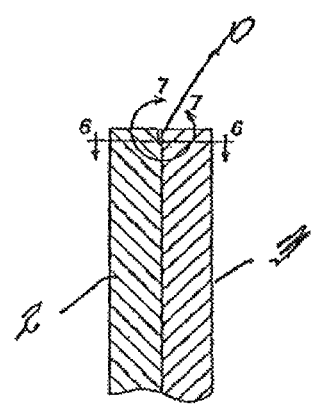
FIG. 5 shows the application of a small screw to hold the sleeve portions aligned in place, when assembled about its post.
Figure 6:
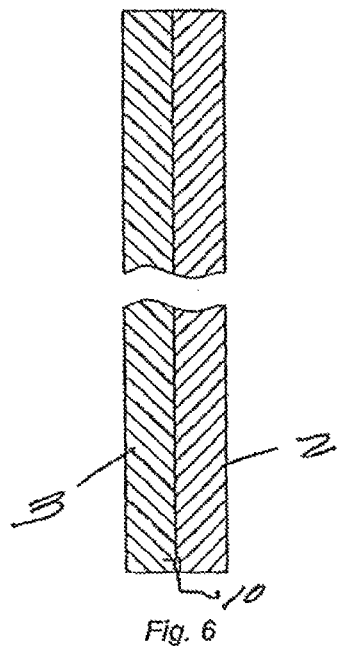
FIG. 6 shows the location of the screw affixing the two sleeve portions together, taken along the line 6-6 of FIG. 5.

FIG. 6 shows how the screw (10) locates at the bottom of the sleeve portions in order to maintain their alignment, once installed, into a tubular sleeve configuration, generally as shown taken along the line (6-6) of FIG. 5. In addition, FIG. 8 is a bottom sectional view, in further enlargement, showing the sleeve portions (2) and (3) and the screw means (10) for maintaining the sleeve portions in alignment, once installed.

Figure 9:
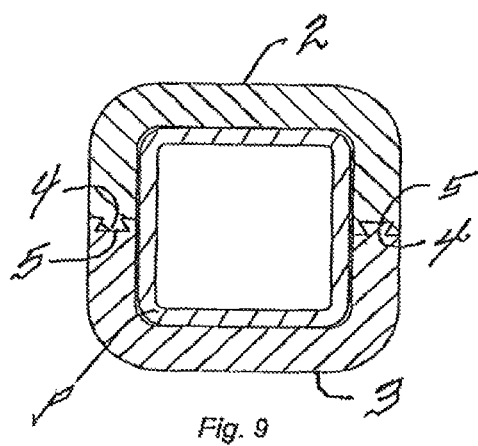
FIG. 9 provides a cross-sectional view showing a tongue and groove interconnection between the sleeve portions for securement of them together about a post.

FIG. 9 shows in a further enlarged view the combination of the sleeve portions (2) and (3), and their tongue and groove configurations (4) and (5), into connection about the square or other non-round post (P), as previously reviewed. Obviously, the same type of connection can be provided for securement of the sleeve portions about the post of other shapes, such as the round post or as previously noted in FIG. 2.

Figure 10:
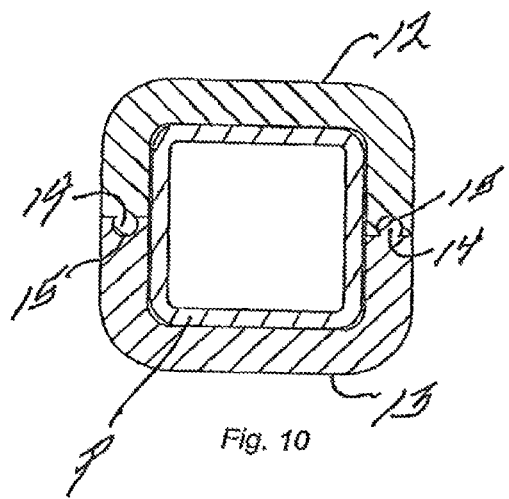
FIG. 10 shows the modification to the tongue and groove connecting means for holding a pair of sleeve portions together about its post.

FIG. 10 shows how the sleeve portions (12) and (13) may be modified, to provide a ball (14) and socket (15) between the two sleeves, as noted. This shows how the interconnection may be made between a pair of sleeve portions, through jointing means similar in principle to that as the tongue and groove interconnection, but which may be of a different shape.

Figure 11:
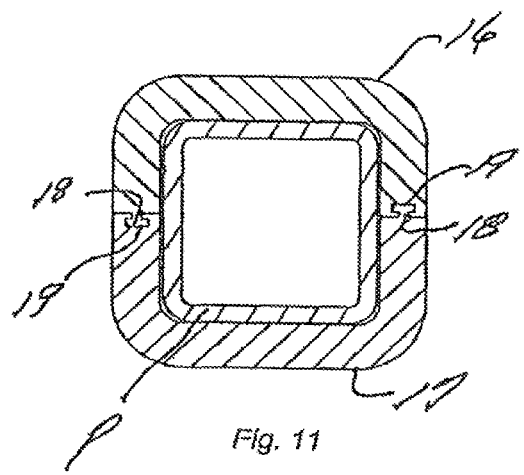
FIG. 11 shows a further modification to the tongue and groove interconnection means for holding the sleeve portions about their post.

FIG. 11 also shows how the sleeve portions (16) and (17) may be held by a T type lock (18) in a corresponding slot (19) and secured about the post (P). It will be understood that the same types of interconnections between the various sleeve portions can be used for accommodating their securement about posts of other shapes, such as the round post as disclosed in FIG. 2.

The forgoing description of the means for interconnection of sleeve portions about structured post or piles for docks, piers, decks, and other structures, provides the basics for securement of a tubular sleeve about such post, in preparation for their usage for cooperating with other accessories, to add to the conveyance of the usage of the dock, being fully assembled.

Figure 12:
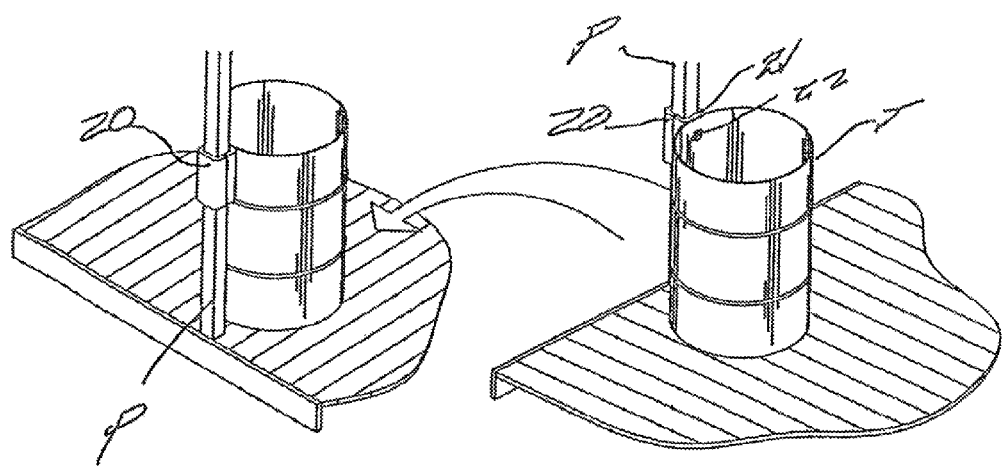
FIG. 12 provides oblique views of the use of the sleeve portions for connecting and holding a trash container to a post.

For example, FIG. 12 shows how the tubular sleeve (20) may be secured around a post (P), and the frontal portion of the sleeve, as along its sleeve portion (21), may be secured by a screw (22), or other means of fastening, for holding a trash container (T) in position to the boat dock, deck, or the like. The purpose of providing for such of a more permanent installation to the trash container is that it prevents the container from being tipped over, strewing the trash all over the dock or deck, which can be accomplished by any scavenging animal, such as a raccoon, as frequently occurs. Alternatively, the screw (22) may locate through the wall of the container (T), but it may include one of those slot type connections, wherein the upper slot is small enough to lock onto the head of the screw, but that a larger slot or annulus therein below allows for the head of the screw to be cleared, by the trash container, when it is to be emptied, or removed. This is an example as to how the tubular sleeve (20) can be used to secure another accessory to it, to provide for a device and means for affixing the trash container in place.

Figure 13:
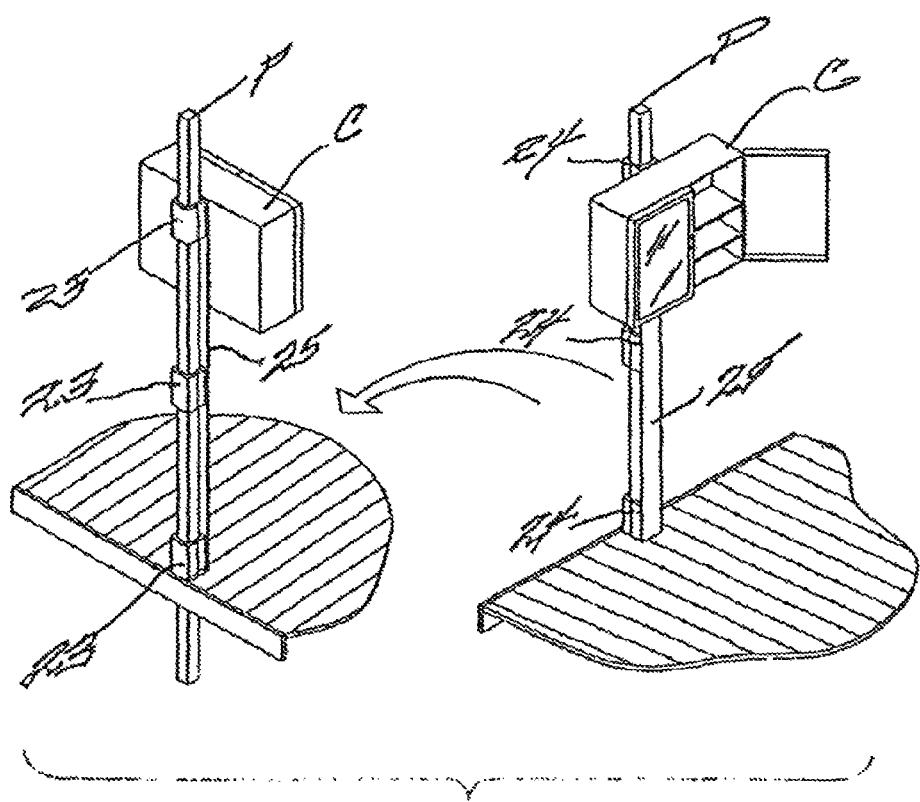
FIG. 13 shows a pair of isometric views showing the sleeve portions connecting with its post for holding a storage cabinet in place.

An example of a further and modified type of attachment system is shown in FIG. 13. In this particular instance, there are a series of back sleeve portions (23), and these are provided for securement through the type of connections as explained in FIGS. 9-11, to frontal sleeve portions (24), as shown. Frontal sleeve portions are integrally formed connecting with the upright member (25) or they may be secured thereto by means of a screw or other fasteners, so that when the entire assembly is connected into position, as shown in FIG. 13, it provides a frontal upright (25) to which other accessories may be connected, during usage of this system. For example, a utility cabinet (C) can connect to the upper end of the member (25), and provide a storage cabinet into which other tools or equipment, or supplies, may be placed, upon the dock or deck, and be maintained in relative security, to prevent their dropping into the water, or the like.

Figure 14:
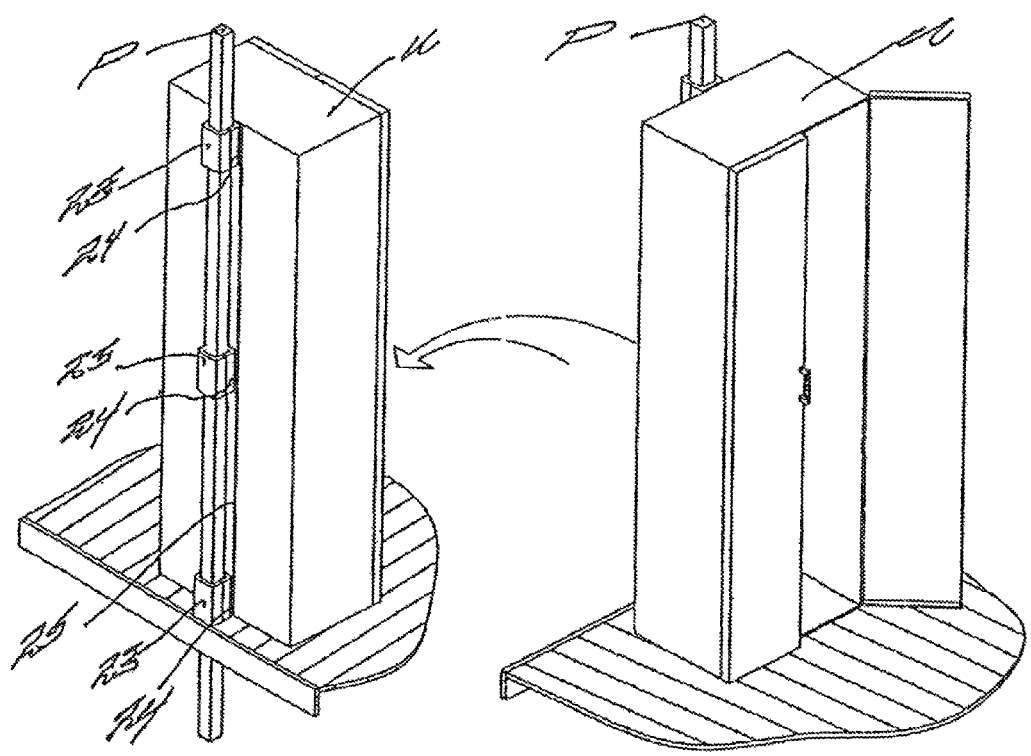
FIG. 14 shows the use of the sleeve portions for holding an elongated storage cabinet in place upon its associated post.

FIG. 14 shows a similar type of connection for a series of tubular portions (23) and (24), the latter being interconnected with the upright member (25), for securement about the post (P), as noted. In this instance, a complete utility cabinet (U) may be bolted or otherwise fastened to the upright member (25), to provide for its permanent securement in place, as can be readily understood. Thus, it provides a secure system for connecting other accessories, such as the utility cabinet (U) shown, to a post or pier of a dock or deck, as is disclosed. Once again, the sleeve portions (24) may be integrally formed with the upright member (25), as being molded therewith, or the sleeve portions (24) may be bolted or otherwise secured to the upright member (25), during assembly.

FIGS. 15-17 show a further usage of an embodiment of tubular sleeves (26) described herein about the post (P). In this particular instance, a utilitarian handle (H) may be secured to the frontal sleeve portions (27) for securement of the handle to the post, and to add to the usability of the dock, particularly where passengers may be boarding or unboarding of a boat or yacht, from the dock, during participation in a boating activity. The lower end of the post (P) may include a further elongated sleeve member (28) which may be secured into position in the same manner as for the previously defined sleeves, for holding a bumper (B) in place, along the edge of the dock.

As further noted in FIGS. 16 and 17, screws or bolts (29) may be used for fastening the handle (H) to the tubular sleeves. This can generally be seen in the cross-section provided in FIG. 17, which is a transverse section taken along the line 17-17 of FIG. 15. This simply means for securement of a handle (H) to a post, through the usage of the sleeve system, is of significant value because it makes it much easier for participants to get in and out of boats or to get off of a deck by being able to grasp a very stable handle (H), as shown.

FIG. 18 shows how a singular tubular sleeve (30) may be used for holding a semicircular table (T) or a half table, to a post (P), upon the deck or dock (D).

FIG. 19 shows how a series of sleeve portions (31) can be mounted high up upon the various posts (P), as noted, and which may be the style of post as shown in FIG. 13, having upright members (32), and through the use of a hook attachment (33) secure an overhead net (N) which may be used for storage of various other accessories, such as cushions, floatation devices, life vests, and the like, or simply function as a means for holding a sunscreen for occupants of the boat, that is moored in its berth within the dock as shown.

Figure 20:
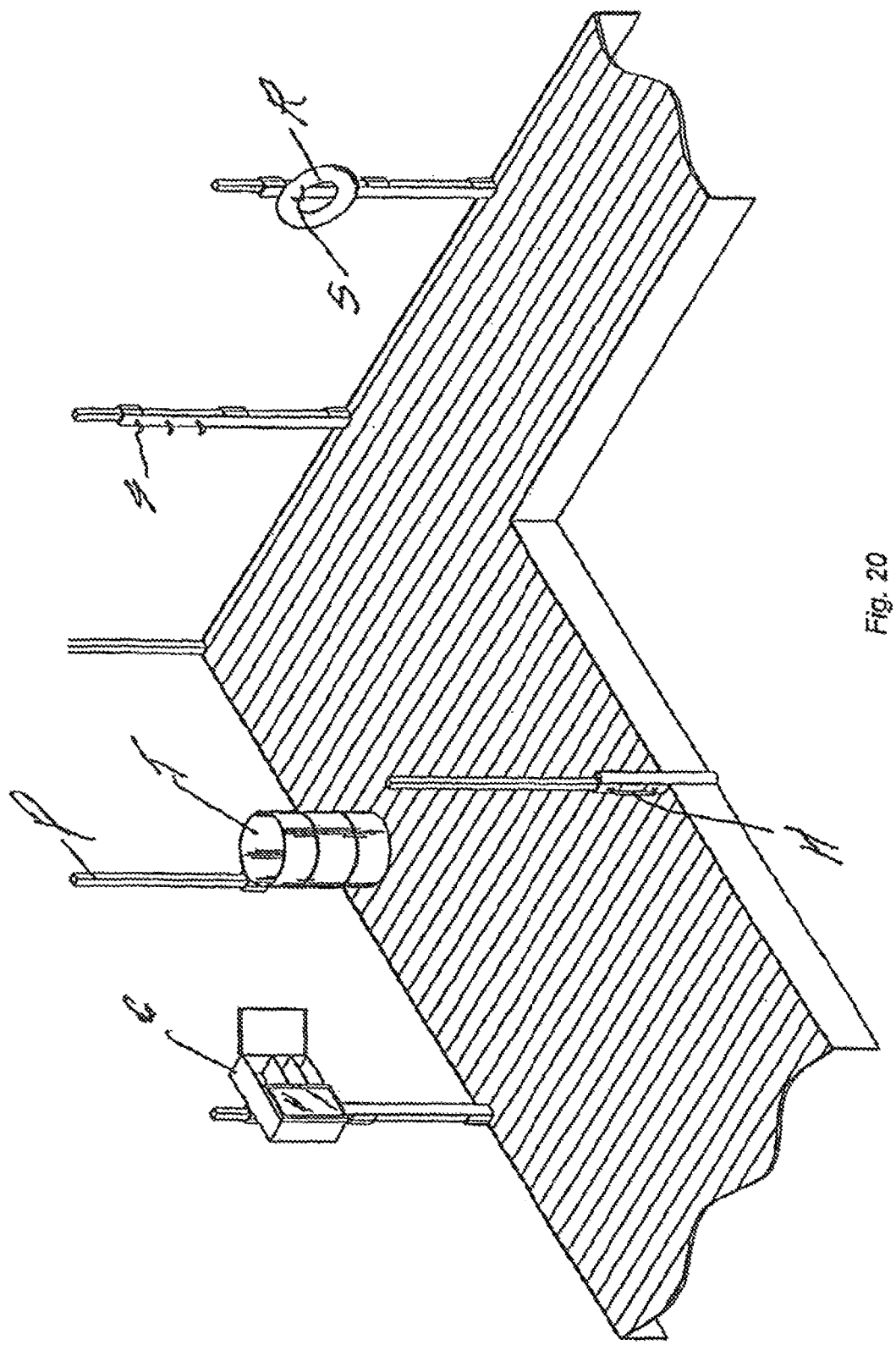
FIG. 20 shows the use of the sleeve portions for connecting to various post of a dock or deck, and for holding a variety of accessories, such as a cabinet, container, hooks, handle, and other utilitarian means in place.

FIG. 20 provides a composite view of how secured posts of a dock can be used with the tubular sleeves of this invention to secure various items about the various posts (P). Shown is a utility cabinet (C) being held in place, as explained in FIG. 13, a trash container (T) is secured as noted, a handle (H) can be secured at a convenient location upon the dock. Similarly, a series of hooks, as at (S), can be positioned for accommodating the hanging of other accessories, such as the lifesaver ring (R). This is an example of the variety of interconnections that can be made for the attachment system for holding convenient accessories in place.

FIGS. 21 and 22 disclose how the tubular sleeves (34), fabricated and assembled in the manner as previously disclosed herein, can hold a boat dock bumper (B) in place upon a dock. Once again, the tubular sleeves (34) will be made up of the tubular portions (35) and (36), in the manner as previously discussed. The frontal tubular portion (36) will secure the bumper (B) thereto by means of any type of fastener (37).

Figure 22A:
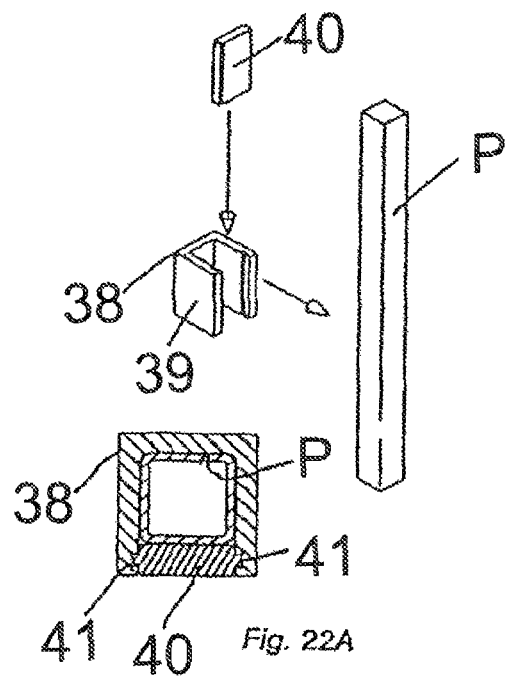
FIG. 22A discloses a modification to the sleeve portions, where the sleeve may encompass three surfaces of its supporting post, and have a tongue and groove plate for interconnecting with the sleeve as it encompasses its associated post.
Figure 22B:
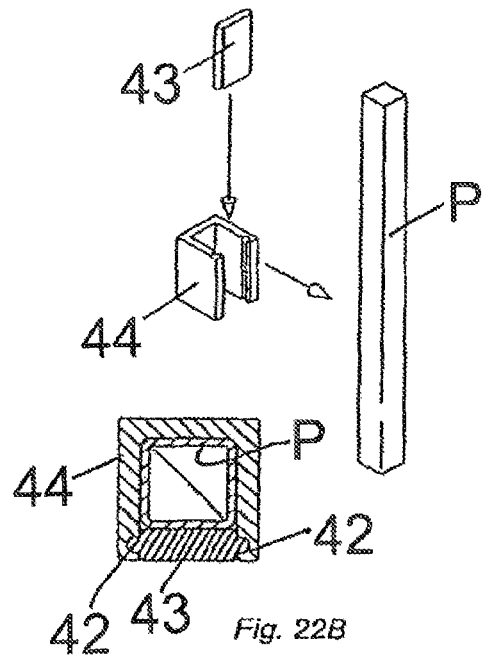
FIG. 22B shows a modified type of connector means for holding the front plate of the sleeve portion in place.
Figure 22C:
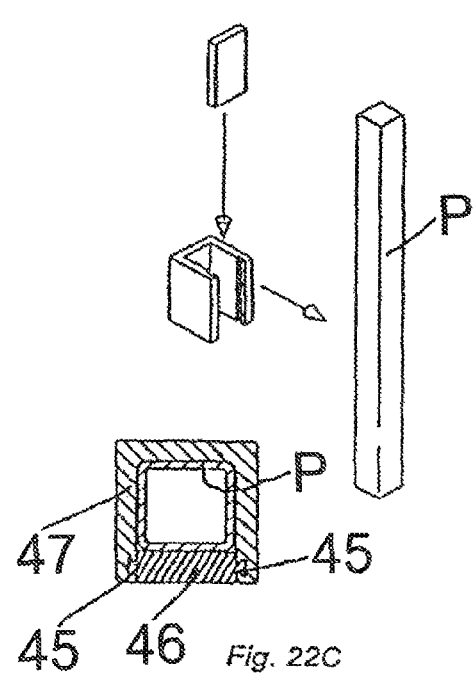
FIG. 22C shows a further modified means for connecting of the front plate of the sleeve portion in place.
Figure 22D:
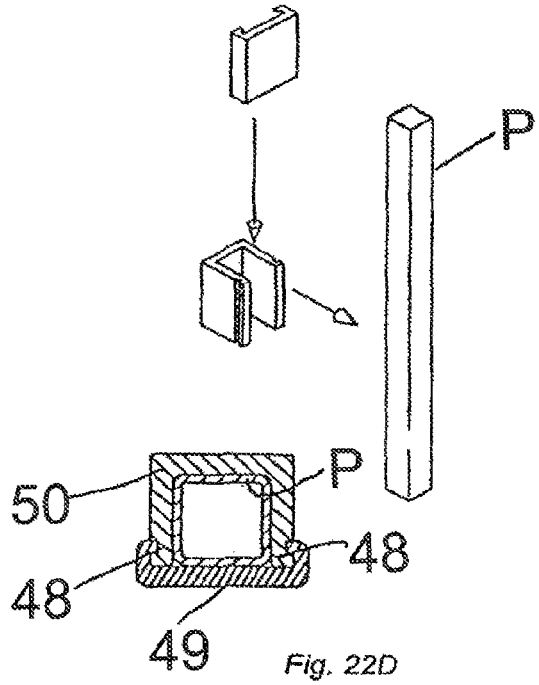
FIG. 22D shows a further modification to the interconnecting of the front plate of the sleeve portion about the post when assembled.

FIGS. 22A-22D show various other structures, a modification to the sleeves, for securement about the post (P) as noted. As can be seen in FIG. 22A, the tubular portion (38) can encompass ¾" of the post (P), by providing integral walls (39) in a U shape along three sides of the post (P). Then, a frontal plate (40) may be slid through its tongue and groove interconnection as noted at (41), for forming the complete tubular sleeve when assembled around the post (P) in preparation for usage, in the manner as previously described. FIG. 22B shows how a ball and socket type connection (42) may be used for holding the modified plate (43) to its sleeve portion (44). FIG. 22C shows how a T slot interconnection (45) can hold the front plate (46) to the tubular portion (47) and interconnected into a tube sleeve about the post (P). FIG. 22D shows how the exterior slotted interconnection (48) can hold its front plate (49) to the sleeve portion (50) in securement of the tubular sleeve about the post (P), as can be noted.

Figures 23, 24, 25:
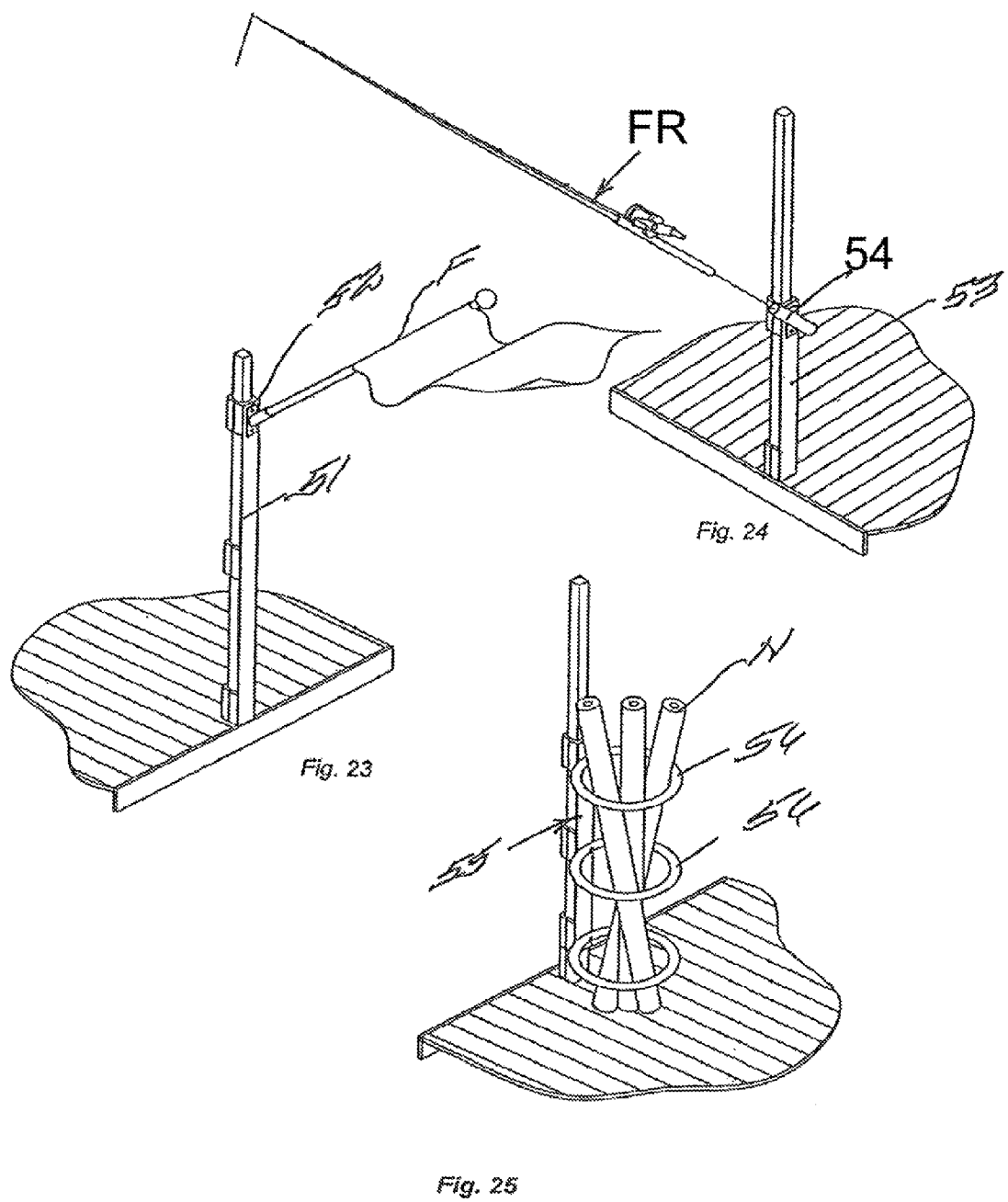
FIG. 23 shows the sleeve portions for use for holding a bracket for mounting a flag or other means to the deck or boat dock post.
FIG. 24 shows a bracket connecting to a sleeve portion for holding a fishing rod in place during usage.
FIG. 25 shows a further modification to the sleeve portions and how they mount annuluses for holding swimming accessories, such as noodles, in place.

FIG. 23 shows how the attachment system (51) made in accordance with the type of attachment as shown in FIG. 13, may include a bracket (52) at its approximate upper end, and the bracket may hold a flag (F) unfurled, during display.

FIG. 24 shows how the same type of attachment system (53) also includes a bracket (54), which may hold a fishing rod during usage.

FIG. 25 shows how the same attachment system (55) can have a series of annuluses or rings (56) attached thereto, and can be conveniently used for holding other accessories, such as swimming accessories, like the noodles (N) shown, in position, and to prevent them from falling onto the dock or deck and into the water, or the like.

Figure 27:
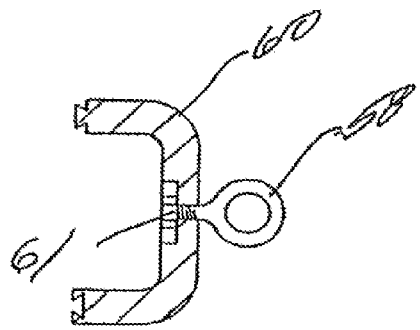
FIG. 27 shows how the upper sleeve portions incorporates a ring, for securement of a mooring rope thereto.
Figure 26:
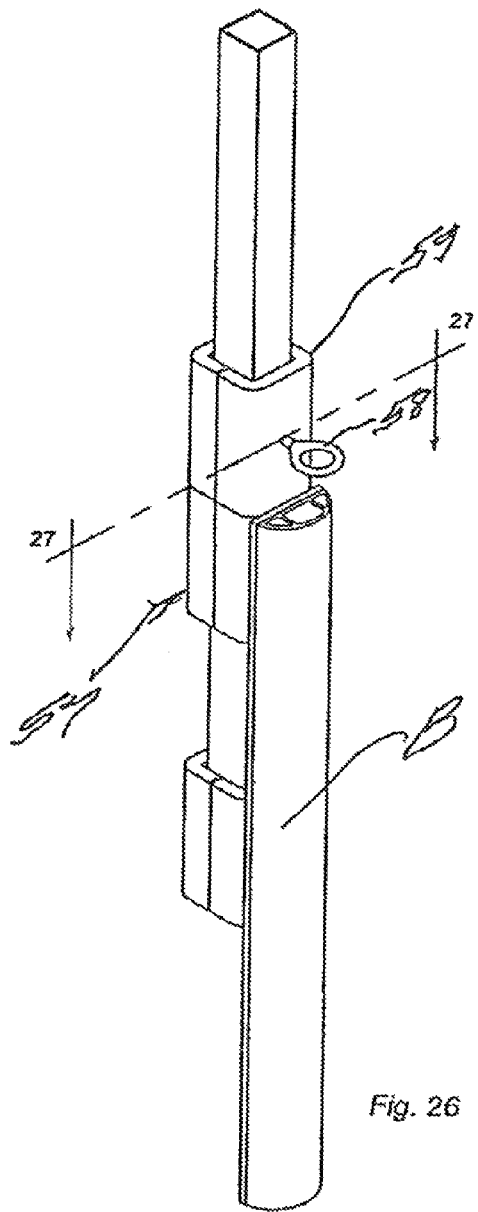
FIG. 26 shows the sleeve portions holding a boat bumper to the dock post.
Figure 28:
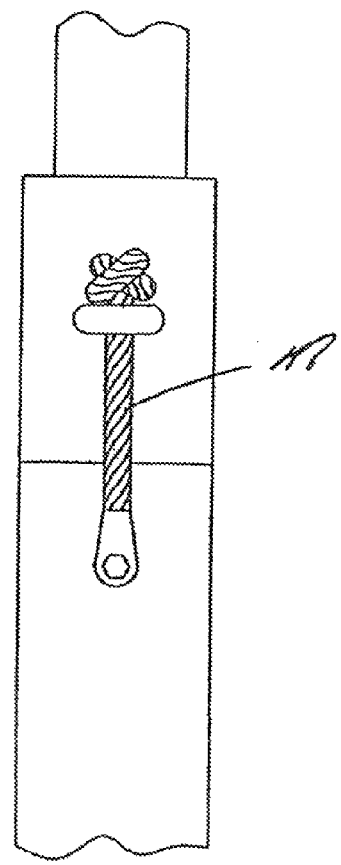
FIG. 28 shows a mooring rope securing to the ring of the sleeve portion shown in FIG. 27.

FIGS. 26-28 disclose the type of attachment system (57) generally, for holding a boat dock bumper (B) in place. In this instance, there may be a ring for securement of a boat mooring rope (M) when the boat is tied up at the dock. The means for securement of the eyelet (58) and its interconnection to the frontal tubular portion (60) by means of the fastener (61) can be seen in FIG. 27.

The above discussed Figures provide a myriad of examples as to how the embodiment of the tubular sleeves described herein can be accommodated upon the post, or even a pile, of a dock or deck, and cooperate for holding other accessories in place for the convenience of the dock owner and other users.

Figure 29:
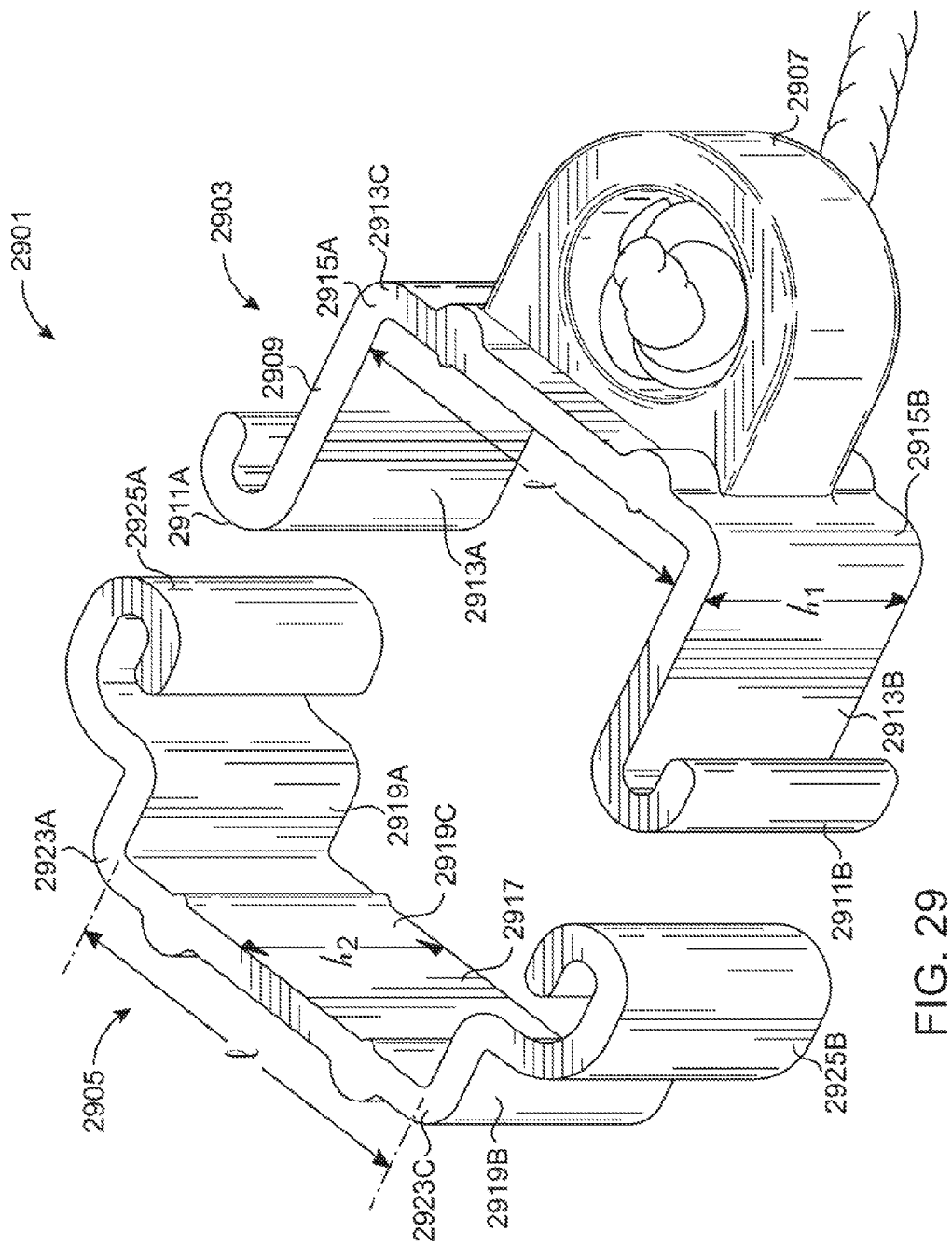
FIG. 29 shows an embodiment of a dock connecting system according to the present disclosure.

FIG. 29 depicts an alternative embodiment of an attaching system and apparatus according to the present disclosure. In the depicted embodiment of FIG. 29, the dock connector system (2901) comprises two corresponding and interlocking sleeve components (2903) and (2905). These two sleeve components, (2903) and (2905), comprise two opposing components that, when joined, form a sleeve generally in the configuration of a hollow rectangular prism, with interlocking components disposed on the exterior of the prism. In the depicted embodiment of FIG. 29, a first sleeve portion (2903) comprises an attaching element (2907) rigidly attached to a body element (2909). The first body element (2909) is in turn rigidly attached to interlocking elements (2911A) and (2911B). The sleeve portion (2903) may also be referred to herein as the sleeve portion, and the second component (2905) may also be referred to herein as the mating portion, to clarify and distinguish the two components.

In the depicted embodiment, the body element (2909) is generally in the configuration of a three sided square "U-shape." That is, the body (2909) comprises three panels (2913A), (2913B) and (2913C) configured in the shape of a square "U." The base panel (2913C) is rigidly attached to the attaching component (2907). The two side panels (2913A) and (2913B) are rigidly attached to the base panel (2913C) at opposing ends of the base panel (2913C) to form opposing corners (2915A) and (2915B), and are generally perpendicular to the base panel (2913C) and extend generally in parallel from the base panel (2913C) in the same direction. Thus, the top surface of the U-shape is generally planer, as is the opposing bottom surface, with the body of the panels extending therebetween. Although a planer configuration is depicted, this is not necessary, and other configurations are possible within the spirit and scope of this disclosure. The depicted base (2913C) and side panels (2913A) and (2913B) are all flat components generally in the configuration of a rectangular prism, though, in an embodiment, only the interior surfaces of the base (2913C) and side panels (2913A) and (2913B) may be flat (to accommodate a post), and the exterior surfaces may comprise other shapes, or configurations, or contours.

In the depicted embodiment, the corners (2915A) and (2915B) are generally orthogonal as between the base (2913C) and the side panels (2913A) and (2913B), but the outside of the corners, (2915A) and (2915B) are rounded. This rounding removes an otherwise sharp edge which could cause injury if a person stumbles into it, or damage personal property. The device may be formed via additive manufacturing, or "3-D Printing," but in the preferred embodiment the product is formed of painted aluminum, steel or other plastics, metals, or other materials having sufficient strength and weathering characteristics to be used outdoors seasonally or year-round. Because the device is intended for use on a boat dock, the selected materials should be sufficient to withstand weathering in use near water, including both fresh and saltwater.

The height $h_1$ of the body (2909) may vary from embodiment to embodiment, but is generally sufficient to provide a tall enough surface on the base panel (2913C) for the attaching element (2907) to be affixed to the sleeve (2903). In the depicted embodiment, the attaching element (2907) is a generally annular element, or an eyelet, for attaching a rope, but other attaching elements are possible, some of which are further described elsewhere herein. In the depicted embodiment, the attaching element (2907) is disposed on an outside surface of the base panel (2913C), so that a post may be disposed within the interior of the assembled device. In the depicted embodiment, the height $h_1$ of the body (2909) is generally uniform, but in an alternative embodiment, the height $h_1$ of the side panels (2913A) and (2913B), may be, in whole or in part, greater or less than the height of the base panel (2913C), or the height may vary within a component, such as for aesthetic purposes, or for carve-outs to accommodate fixtures, hardware, or other protrusions on the post to which the device is to be attached. The configuration of the interlocking components (2911A) and (2911B) will be discussed elsewhere herein.

Referring still to FIG. 29, the second component (2905) is essentially a mating portion or a mating component configured to interlock with the sleeve portion (2903). The mating portion (2905) is also generally in the configuration of a square U-shape, having a body component (2917) comprising a base side (2919C) with two opposing side panels (2919A) and (2919B) attached generally perpendicularly thereto at the opposing lateral edges of base panel (2919C), forming orthogonal corners (2923A) and (2923C). These corners are likewise rounded on the outside, primarily as a safety feature.

The side panels (2919A) and (2919B) are also rigidly attached to interlocking components (2925A) and (2925B). As described elsewhere herein, these interlocking components (2925A) and (2925B) are configured to interlock with the corresponding interlocking components (2911A) and (2911B) of the sleeve portion (2903). The base (2919C) and side panels (2919A) and (2919B) are likewise flat components generally in the configuration of a rectangular prism, though, in an embodiment, only the interior surfaces of the base (2919C) and side panels (2919A) and (2919B) may be flat (to accommodate a dock post), and the exterior surfaces may comprise other shapes or configurations. The side panels of components (2903) and (2905) may also be referred to herein as the "legs."

The height $h_2$ of the mating portion (2905) is generally the same as the height $h_1$ of the sleeve portion (2903). However, in an alternative embodiment, the heights may differ, and the height of the component parts of the mating portion (2905) may also differ, as with the sleeve portion (2903). Generally, the lateral distance $l_1$ between the opposing sides (2913A) and (2913B) of the sleeve portion (2903) is about the same as the lateral distance $l_2$ of the opposing sides (2919A) and (2919B) of the mating portion (2905). This is so that, when the two components (2903) and (2905) are interlocked, the lateral distance between the sides is generally uniform. As will be described elsewhere herein, this assists with retaining the device (2901) on a deck post.

Figure 30A:
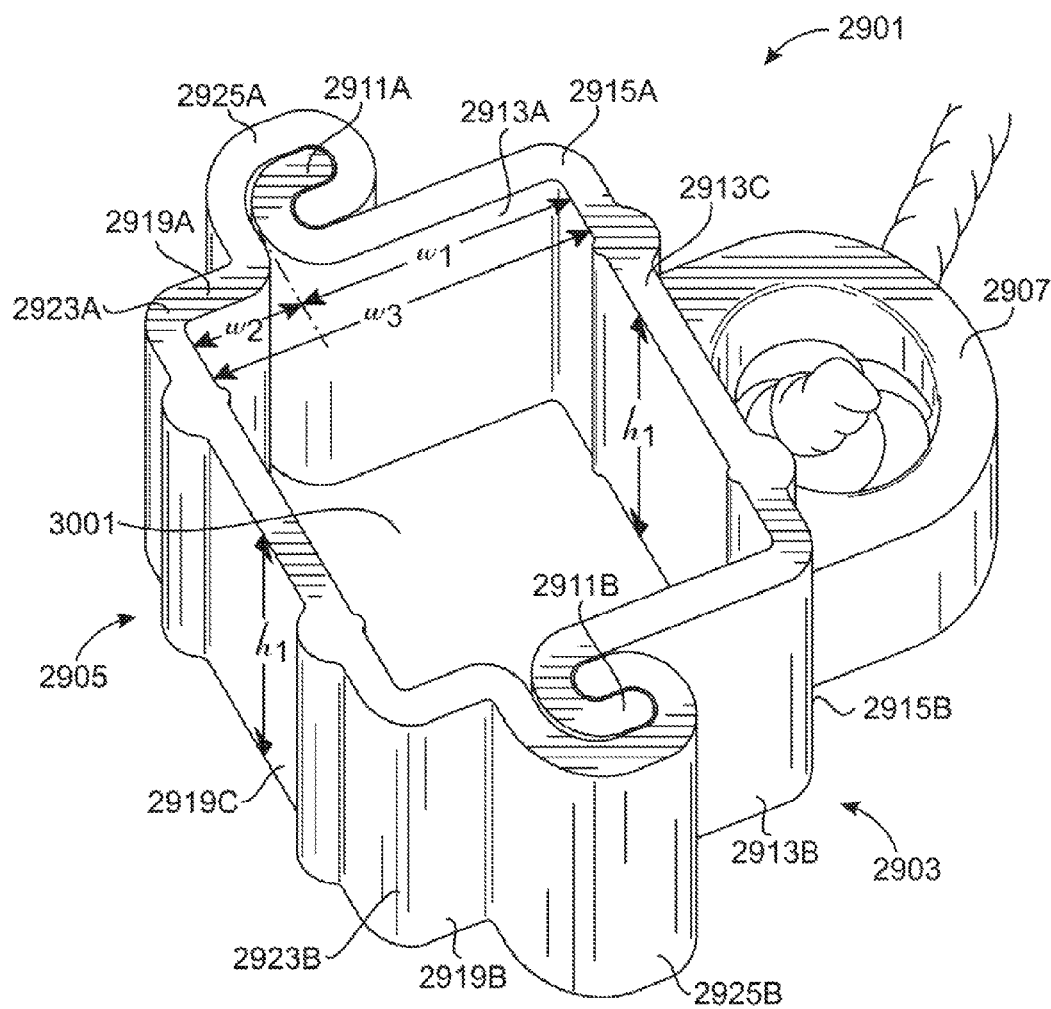
FIG. 30A depicts the dock connecting system of FIG. 29 in an assembled configuration.
Figure 30B:
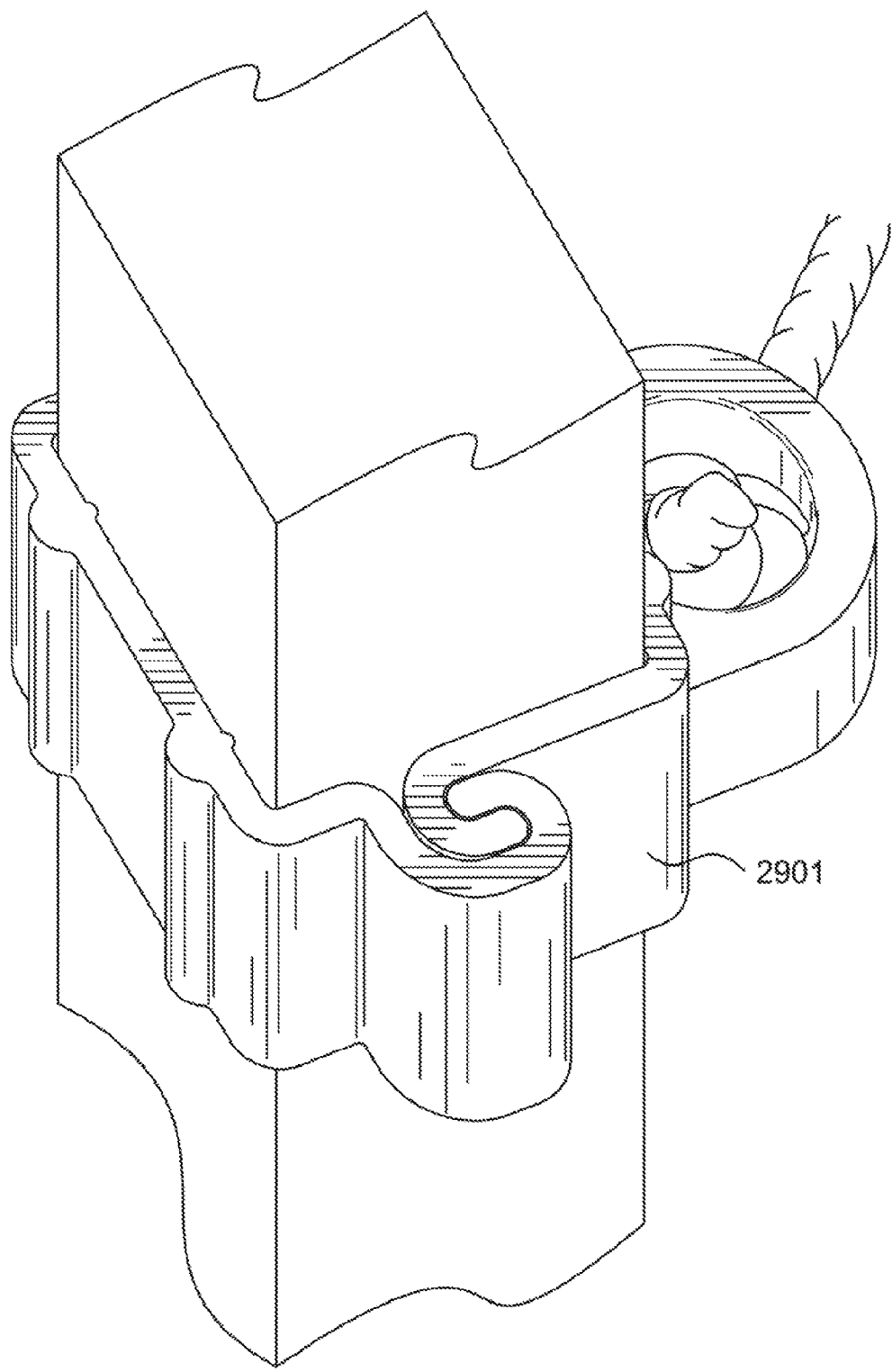
FIG. 30B depicts the assembled dock connecting system of FIG. 30 installed on a post.

Referring now to FIGS. 30A and 30B, the first portion and mating portions (2903) and (2905) of the device (2901) are depicted in an interlocking configuration. As can be seen in FIG. 30A, the interlocking components (2911A) and (2911B) of the sleeve portion (2903) are interlocked with the corresponding interlocking components (2925A) and (2925B) of the mating portion (2905). Again, the specifics of this interlocking will be described elsewhere herein. Also depicted in FIG. 30, the width $w_1$ of the sides (2913A) and (2913B) of the sleeve portion (2903) and the width $w_2$ of the sides (2919A) and (2919B) of the mating portion (2905) are configured to sum to about the width $w_3$ of the deck post to be disposed within the assembled device (2901). That is, the sum of the widths $w_1$ and $w_2$ of sides (2913A) and (2919A) should be about the same as the sum of the widths $w_1$ and $w_2$ of sides (2913B) and (2919B). This causes the assembled device (2901) to have a generally rectangular center opening (3001) in which a deck post or other structure to which the device (2901) is to be attached may be disposed.

It should be noted that the widths of the sides of either component (2903) or (2905) need not be identical or even substantially similar provided that the two components (2903) and (2905) are configured to form a generally rectangular shape. For example, in an embodiment, not depicted, side (2931A) may be long and side (2931B) may be short, but corresponding sides (2919A) is short and (2919B) is long. It should be further noted that these overall widths $w_1$ and $w_2$ take into account the additional width imparted by the interlocking components (2911A) and (2911B), and (2925A) and (2925B). Referring to FIG. 30B, the first and mating portions of the device are depicted in an interlocking, assembled configuration, installed on a post.

Figure 31:
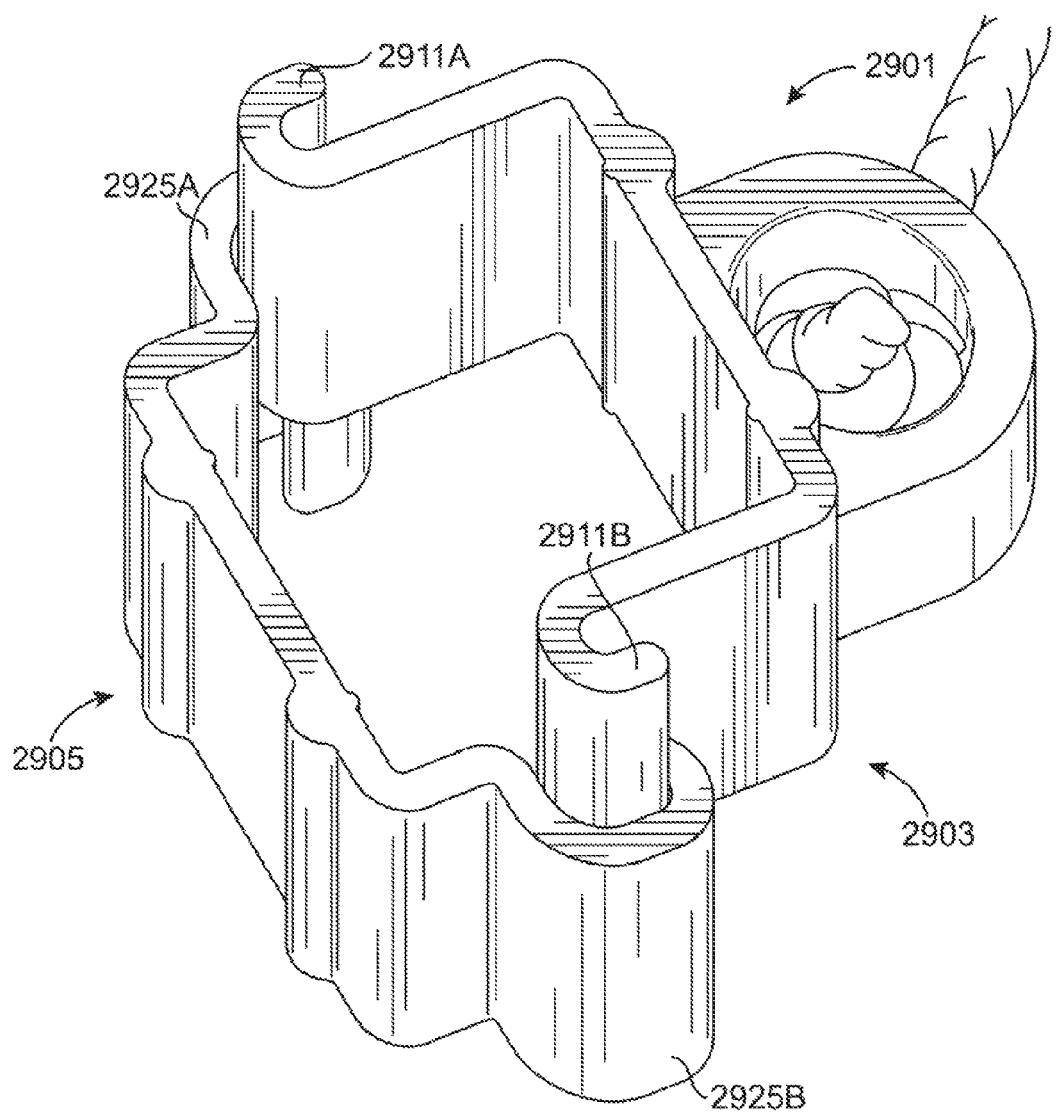
FIG. 31 depicts the dock connecting system of FIG. 29 in a partially assembled configuration.

As can be seen in FIG. 31, the device is assembled by placing the sleeve portion (2903) above the mating portion (2905) such that the interlocking components (2911A) and (2911B) can slide into and interlock with the interlocking components (2925A) and (2925B) of the mating portion (2905). Functionally, the interconnection is similar to a tongue-in-groove system, as would be understood by one skilled in the art. The sleeve portion (2903) is pushed down until the top surfaces of the walls of the two components are generally flush as depicted in FIG. 30. As will be described elsewhere herein. The structure of the respective interlocking components is such that the sleeve portion (2903) will not slide all the way through the mating portion (2905), but will instead be held in place firmly and snugly through the forces of friction.

Figure 32:
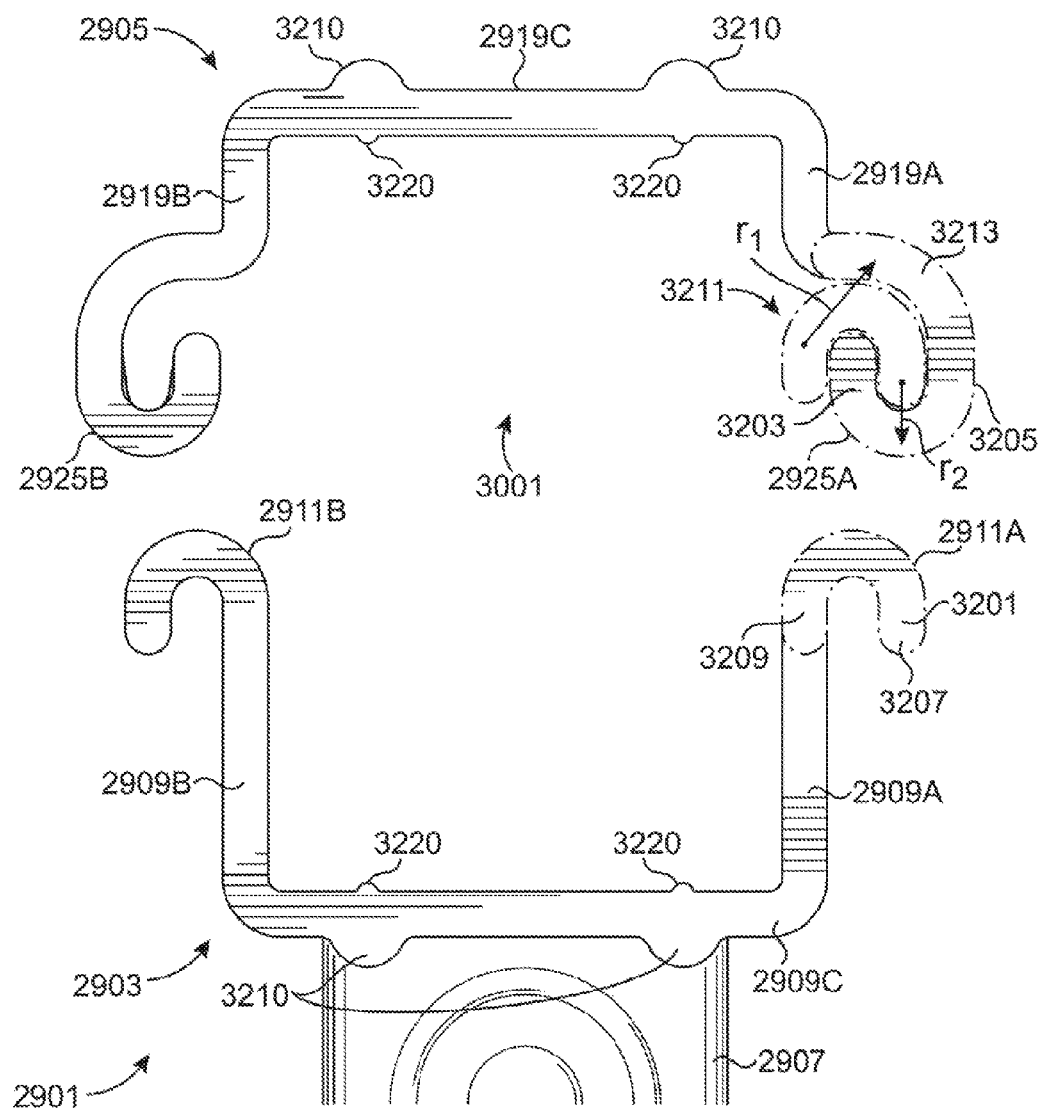
FIG. 32 depicts the dock connecting system of FIG. 29 in an overhead elevation.
Figure 33:
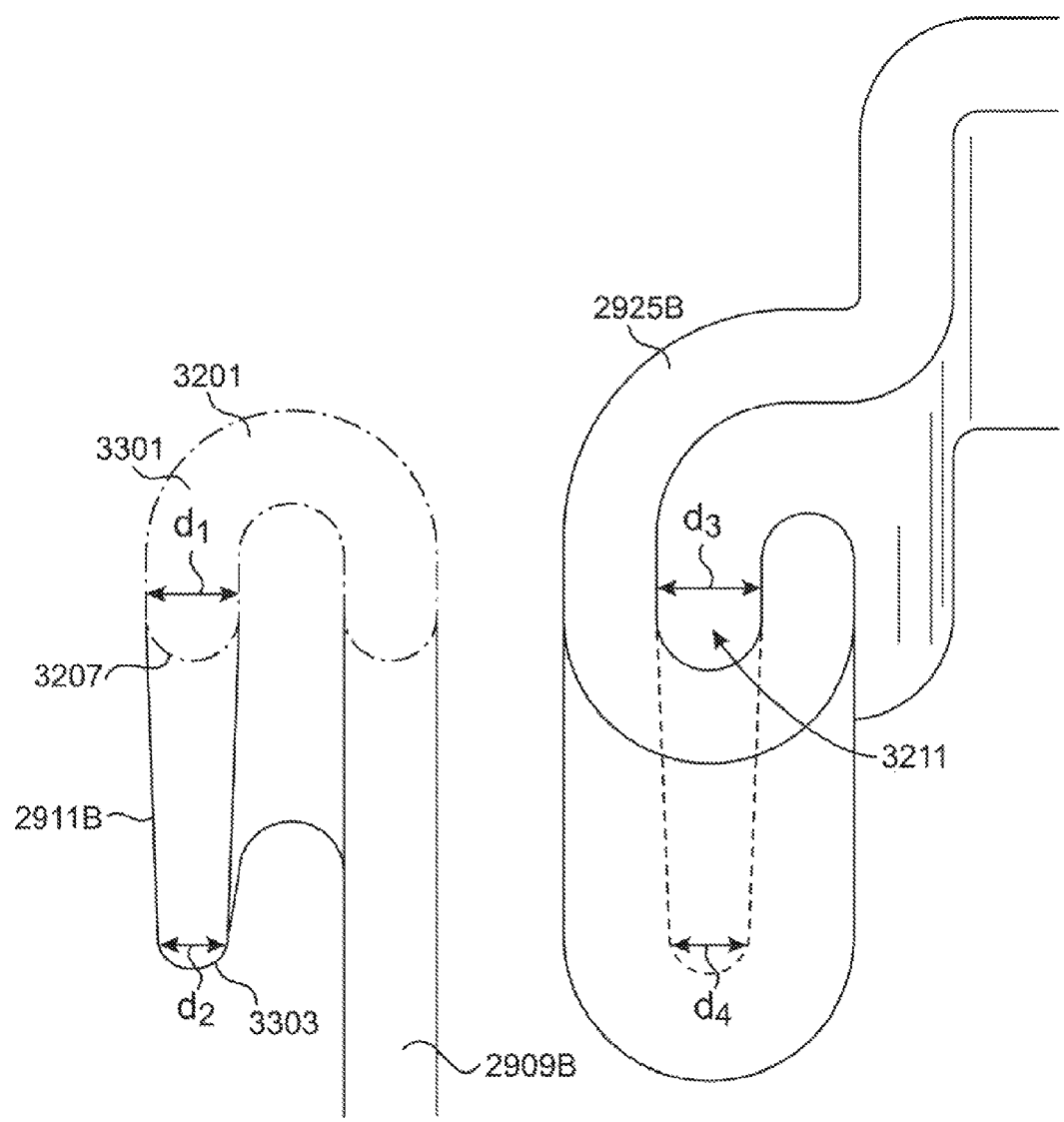
FIG. 33 depicts a detailed view of an interlocking dock connecting system component according to the present disclosure.
Figure 34:
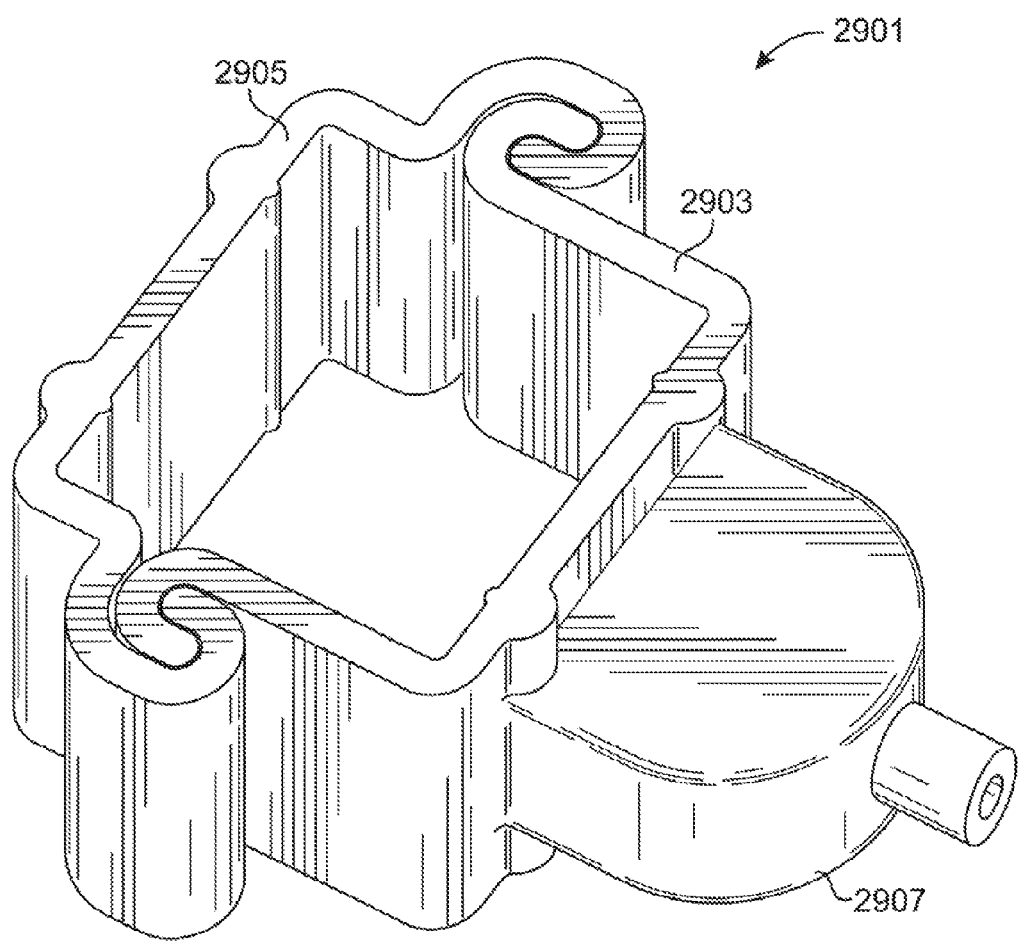
FIG. 34 depicts a dock connecting system according to the present disclosure including a trash can holder attachment.
Figure 35:
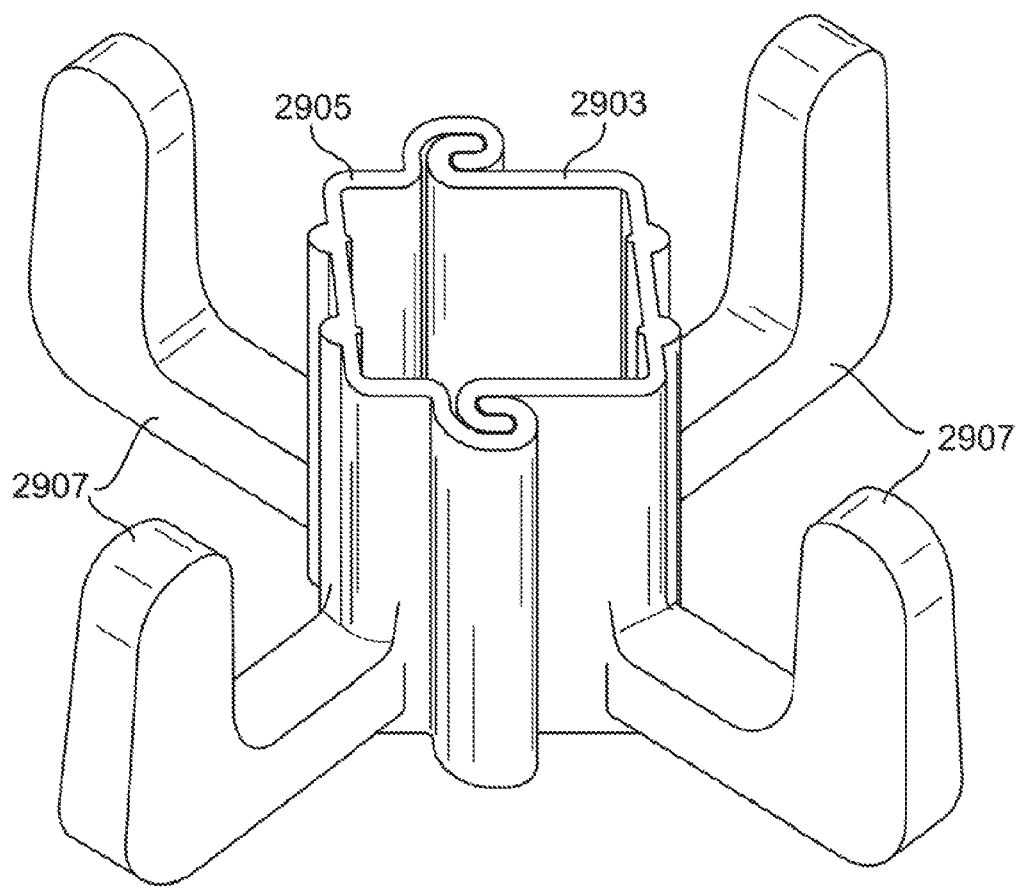
FIG. 35 depicts an embodiment of the dock connecting system according to the present disclosure having an attaching component on both halves of the sleeve, the attaching component being configured as a hooking device.
Figure 36:
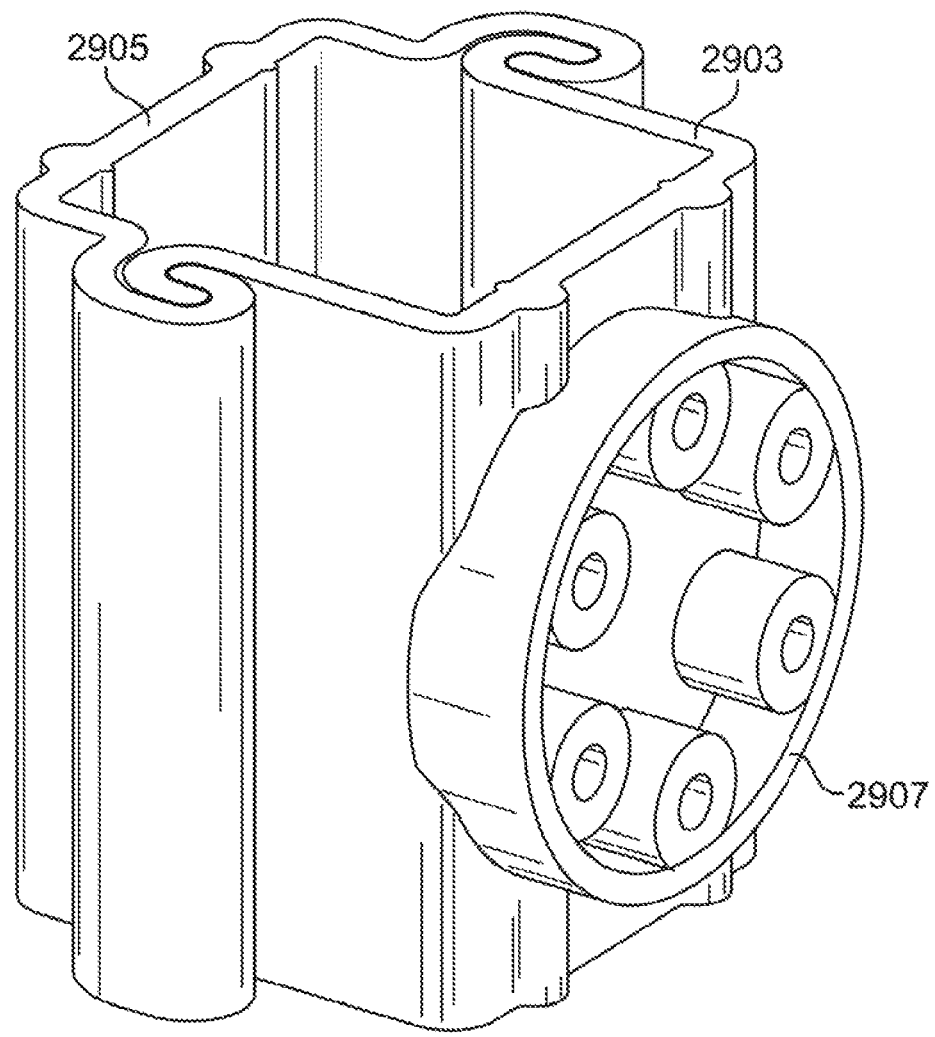
FIG. 36 depicts a dock connecting system according to the present disclosure having a hardware mounting point as the attaching component.
Figure 37:
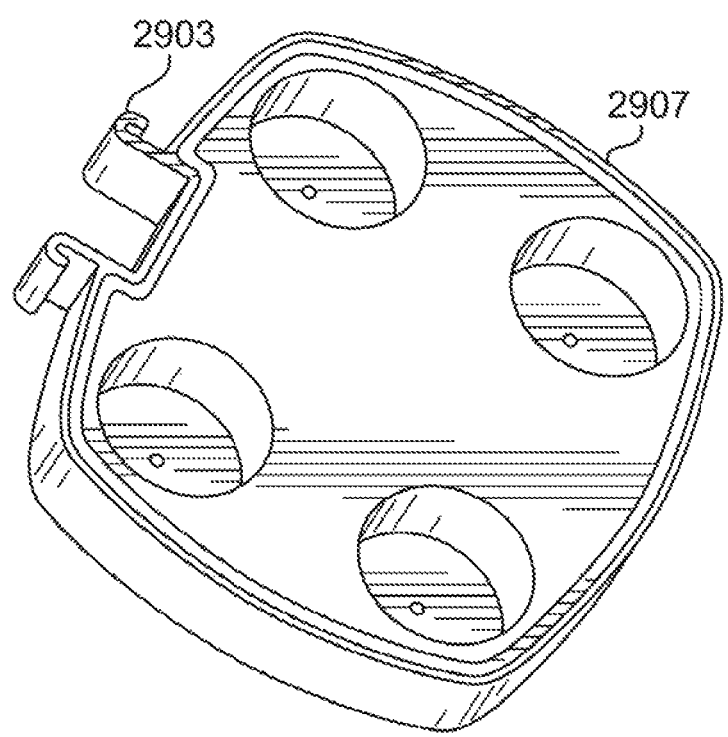
FIG. 37 depicts one half of a dock connecting system according to the present disclosure where the attaching component is a four drink tray.
Figure 38A:
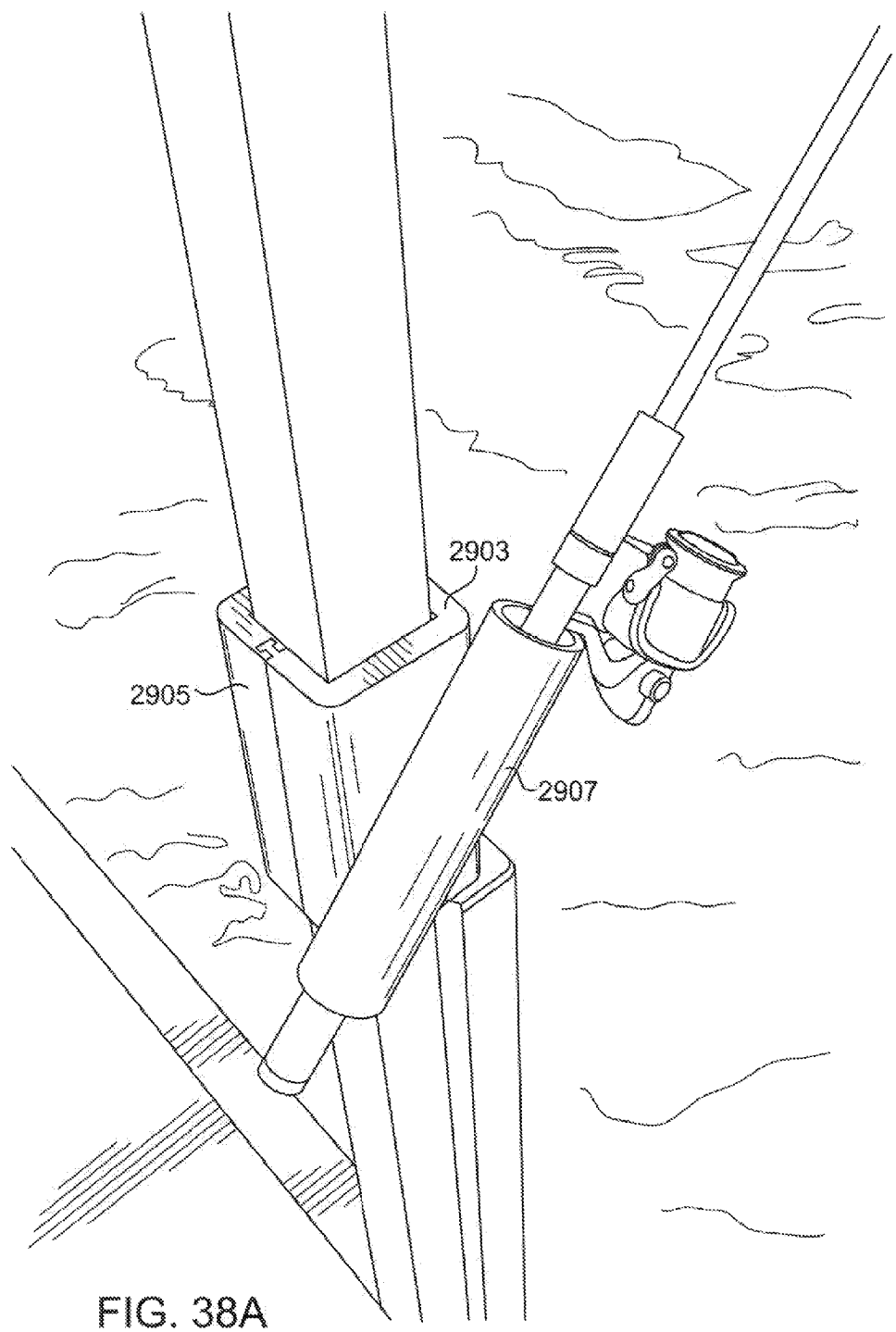
FIGS. 38A and B depict embodiments of a dock connecting system according to the present disclosure wherein the attaching component is a fishing pole holder.
Figure 38B:
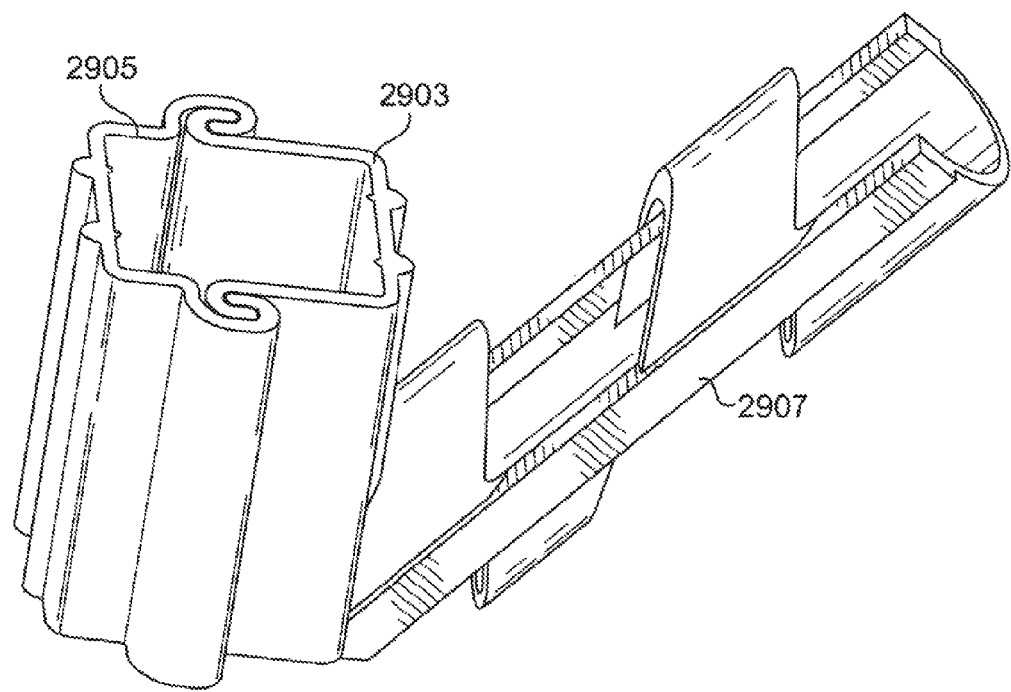
Figure 39:
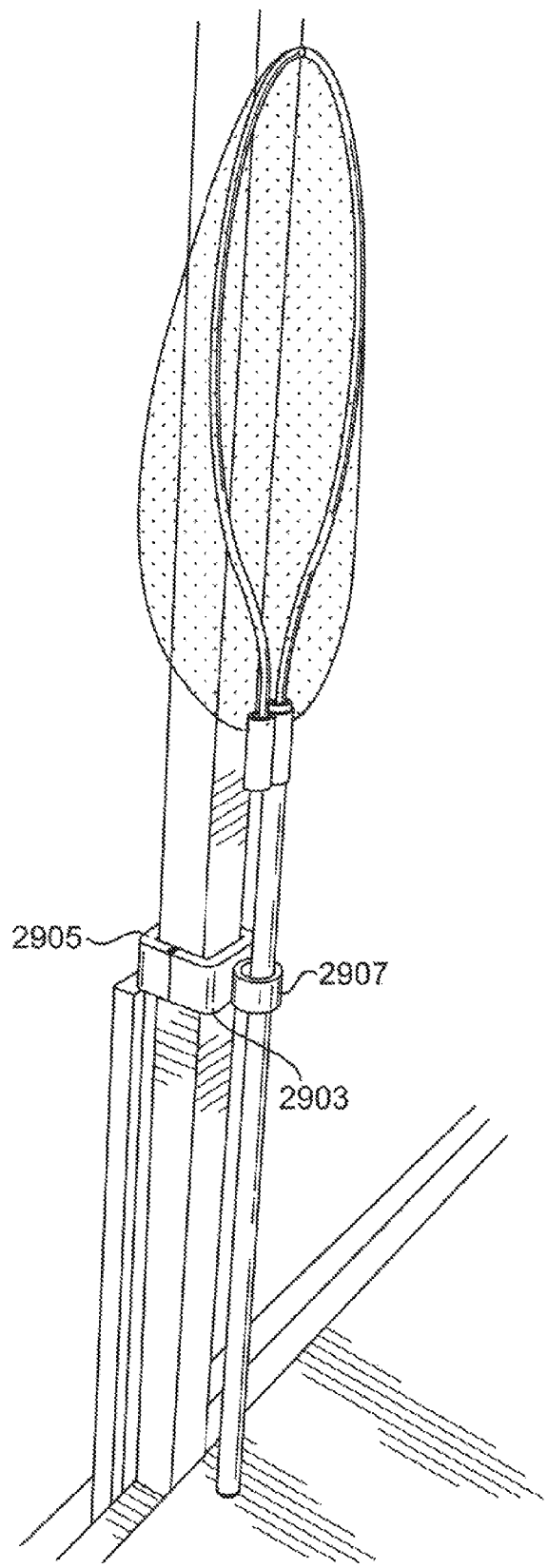
FIG. 39 depicts an embodiment of the dock connecting system according to the present disclosure wherein the attaching component is a ring.
Figure 40:
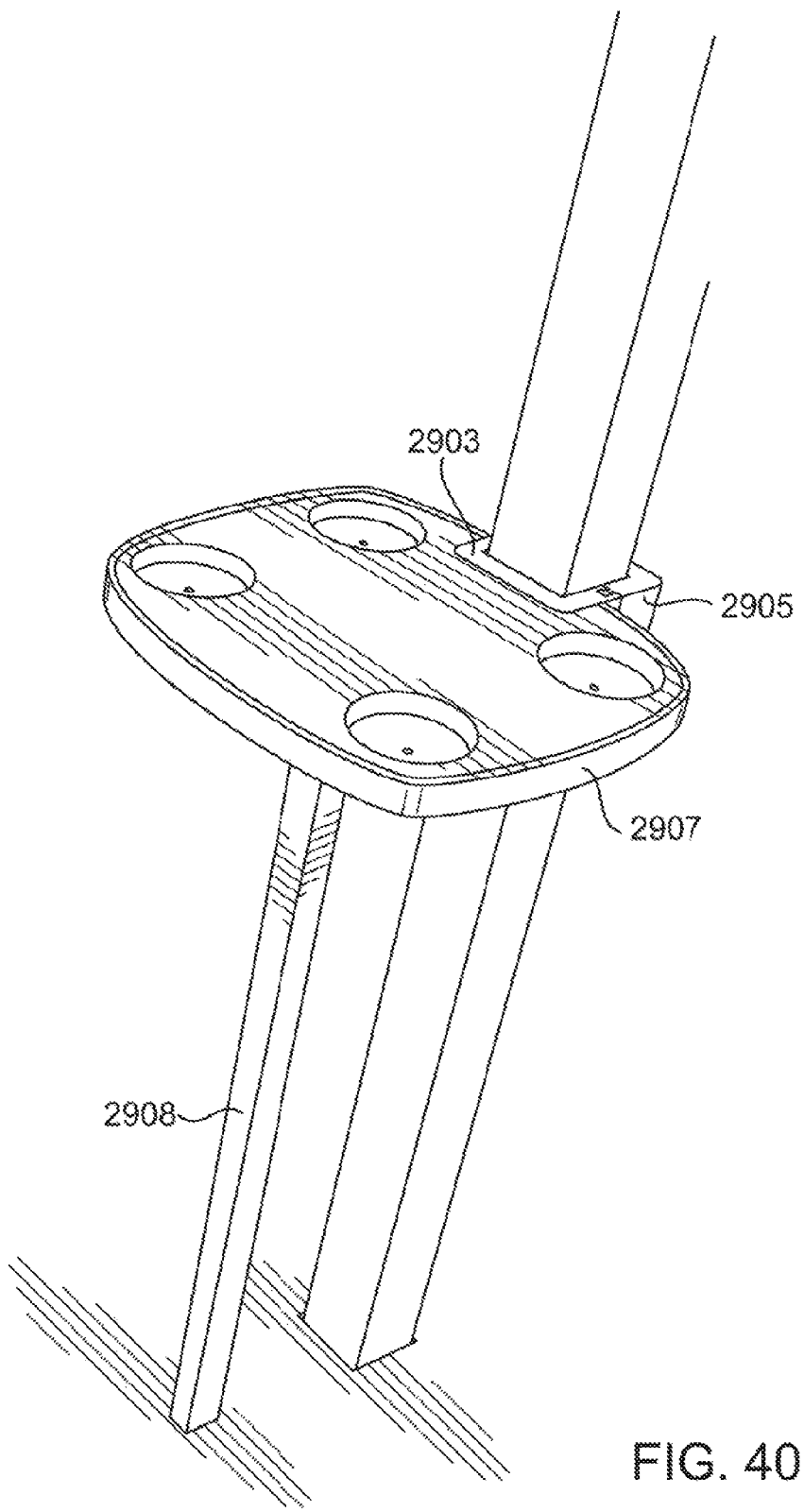
FIG. 40 depicts an embodiment of an assembled dock connecting system attached to a post wherein the attaching component is a four drink tray with a leg stand.

FIGS. 32 and 33 depict the interlocking components in greater detail. Referring to FIG. 32, it can be seen that the overall shape of the interlocking components (2911A) and (2911B) of the sleeve portion (2903) are configured to correspond to the shape of interlocking components (2925A) and (2925B) of the mating portion (2905). That is, interlocking components (2911A) and (2911B) of the sleeve portion (2903) are sized and shaped to fit into empty spaces or voids defined by the shape of interlocking components (2925A) and (2925B) of the mating portion, respectively. For sake of simplicity, the following disclosure is with respect to just one of the two interlocking sides. However, it will be understood by one of ordinary skill in the art that the same disclosure applies to the interlocking components on the opposing side of the device (2901).

In the depicted embodiments, the interlocking component (2911A) is generally in the shape of a rounded, inverted U (3201), or, in conjunction with the leg, a "J" shape. The terminal end of the hook portion of the "J" is disposed laterally outward of the "U"-shape of the main body, defining a space between the outside of the leg and the terminal end of the J. Correspondingly, the shape of the opposing and corresponding interlocking component (2925A) is such that it (2925A) defines an empty space (3211) generally in the same shape of at least part of the "J."

As indicated in FIG. 32, the hook (3201) of interlocking component (2911A) has a terminal end (3207) disposed outside the opening (3001), and an opposing "terminal" end (3209), which is simply the rigid attachment of the hook portion (3201) to the side wall (2909A) (which, again, together form the "J" shape). Thus, the exterior terminal end (3207) of the hook is a physical terminal end and the other (3209) is a logical terminal end (3207), understood with respect to the general "J" shape (3201) of the interlocking component (2911A).

Correspondingly, interlocking component (2925A) is configured to define an empty space (3211) having a similar shape (3211). The component (2925A) is generally a curved component (2925A) that circumscribes the outer leg and physical terminal end (3207) of the hook (3201) of component (2911A) when the sleeve is assembled. That is, interlocking component (2925A) comprises a physical terminal end (3203) which, when the pieces are interlocked, is disposed in the center of the hook portion (3201) of interlocking component (2911A). This terminal end (3203) is attached to side panel (2919A) via a U-shaped reverse hook (3205) attached to an arm (3213), which together circumscribe and define part of the shape of the hook (3201), having at least a partial arc therein to prevent detachment. The arm (3213) is attached to the side panel (2919A). The shape of interlocking component (2925A) is generally that of a "G" (3205) attached to the leg (2919A) at the top of the "G," but without a transverse stem (or, conceptually, an unclosed "6").

The depicted arm (3213) of the "G" is approximately a quarter-circle arc, attached to the leg (2919A) at one end, and to the remainder (3205) of the "G" shape at the other. The depicted arm (3213) extends laterally outward from the outside surface of the leg (2919A), and, unlike the hook (3201), does not define a space between the terminal end (3203) and leg (2919A), but rather also extends forward of the end of the leg (2919A). The remainder (3205) of the "G" shape is a generally a U-shape (3205), which curls back towards the arm (3213), extending towards the major plane of the leg (2919A). However, the terminal end (3203) of this U-shape is disposed laterally outward of the plane of the leg (2919A). This configuration accommodates the thickness of the leg (2909A) of the sleeve portion (2903) so that the J-shaped hook portion (3201) of the sleeve portion (2903) can be disposed within the space (3211) defined by the interlocking component (2925A) such that legs (2919A) and (2909A) are generally linearly aligned, or coplanar. In other words, the radius $r_1$ of the arm (3213) is generally greater than the radius $r_1$ of the U-shape (3205).

In the depicted embodiment, the hook (3201) and the U-shape (3205) are both disposed laterally outward from the plane of the respective side panels (2909A) and (2919A). This configuration results in no major structures being disposed within the interior space (3001) defined by the six walls (2919A), (2919), (2913A), (2913B), (2913C), and (2919C) when the device is assembled. This is important because, when the device (2901) is attached to a post, the post will be disposed in interior space (3001), and the space (3001) is generally clear of protrusions. However, note that protrusions may be deliberately inserted to increase the connection between the assembled device and a post, as described elsewhere herein.

The sleeve portion (2903) is prevented from sliding through and becoming detached from the mating portion (2905) by the force of friction. A structure for this function is depicted in detail in FIG. 33. As seen in FIG. 33 and described elsewhere herein, interlocking component (2911B) has a hook portion (3201). The terminal end (3207) of the hook (3201) has a tapered configuration. That is, the diameter $d_1$ of the terminal end (3207) at the top surface (3301) is larger than the diameter $d_2$ of the terminal end (3207) at the bottom (3303). Thus, although the thickness of the body is generally consistent, at the terminal end (3207), the thickness tapers from the top (3301) to the bottom (3303). However, in an embodiment, the dimension $d_3$ of the corresponding space (3211) in the corresponding interlocking component (2925B) is generally consistent from the top to the bottom of the component (2925B). This dimension $d_3$ is larger than the dimension $d_2$ of the bottom (3303) of terminal end (3207), but smaller than the dimension $d_1$ of the top (3301) of terminal end (3207).

Thus, when the sleeve portion (2903) is placed above and pressed into the mating portion (2905), the smaller dimension $d_2$ bottom end of interlocking component (2911B) easily fits into the space (3211) because the dimension $d_2$ is smaller than the size of the opening $d_3$. However, as the sleeve portion (2903) is pressed into the mating portion (2905), the thickness of terminal end (3207) passing through the space (3211) increases until the sleeve portion (2903) can no longer be easily pushed into the mating portion (2905), because dimension $d_1$ is greater than dimension $d_3$. The tapering is generally configured such that the point at which component (2903) can no longer be advanced into component (2905) causes the tops of the respective components to be flush or generally coplanar.

However, it should be obvious to one of ordinary skill, that with the sufficient application of force, the shape of the components could be distorted to cause component (2903) to advance further into component (2905). However, Applicant has found that the amount of force required for such distortions is far in excess of the forces expected to be applied to the device during ordinary, or even rigorous use. Further, the dimensions $d_1$ and $d_3$ are generally configured such that the amount of force required to advance component (2903) completely through component (2905) would result in structural failure before complete through slippage. This amount of force is, again, so far in excess of even extreme operating forces, that, for practical purposes, the connection is unbreakable. However, it should be expected that under sufficient force, some portion of component (2903) may extend past the bottom of component (2905).

As can be seen from this description and the figures, the friction is essentially caused by wedging the wedge-shaped terminal end (3207) of one interlocking component (2911B) into a corresponding space (3211) defined by the walls of the second interlocking component (2925B). It will be further understood that the overall dimensions of the center space (3001) defined by the walls when the device (2901) is assembled are configured to cause the device to snuggly encompass around a post. The specific dimensions will depend upon the dimensions of the post. For example, at many lakes, dock posts are required to be a particular size. By way of example, and not limitation, the post may be square or rectangular. Also by way of example and not limitation, the space may be 2½ inches square.

In an embodiment, the base walls (2909C) and (2919C) may be constructed with internal crush ribs. Additionally, the walls may be constructed with reinforcing members. To hold the device (2901) not only together, but also prevent it from slipping down the post, the interior of one or more walls may further comprise one or more small ridges, protrusions, or bumps (3220) to effectively shorten the dimensions of the interior space (3001) slightly, providing additional friction.

In an alternative embodiment, dimension $d_3$ of interlocking component (2925B) is not generally consistent, but rather also tapers towards the bottom of interlocking component (2925B). In such an embodiment, depicted in FIG. 33, the diameter of the space (3211) at the bottom $d_4$ is smaller than the diameter $d_2$ of the terminal end (3207). This provides further friction for the fit. In a still further embodiment, not depicted, the bottom of component (2905) may be solid and closed off, providing a solid surface to further reinforce the friction fit. Generally, the sizes of the respective distances ($d_3$ as compared to $d_1$, and, if applicable, $d_4$ as compared to $d_2$) is such that the smaller distances are only slightly smaller, allowing for a snug, tight fit. In a still further embodiment, the size differential may be caused, in whole or in part, by a difference in the tapering angle. Applicant has found that the difference in tapering angle as between the terminal end (3207) and the void (3211) need only be about one degree to accomplish a sufficiently strong friction wedge.

This structure has the advantage of strongly attaching for assembly, and strongly attaching to an existing dock post without the use of additional hardware. For an existing dock structure, such as a roof support, it is often not practical to actually drill into the support. Likewise, a solid component cannot be inserted around the deck post without disassembling the post, or cutting it in half and reattaching it. Applicant's structure provides the advantage of being able to be attached around a post without the use of hardware and without having to otherwise remove or damage the post. This is particularly important in highly regulated lake environments, where the dock components may not belong to the dock user or licensee.

The configuration of the attaching element (2907) will vary from embodiment to embodiment depending upon the specific application. In the depicted embodiment, an annular attaching component (2907) is shown, to which a nautical rope is attached. This embodiment may be used to attach a dock bumper, or may simply be a hanging rope which a person can use for balance while disembarking a boat. Other attaching components are possible. By way of example, and not limitation, such components may include attaching points for other hardware. By way of example, and not limitation, two devices (2901) may be disposed, one above another, on a dock post, and a handlebar attached to both via hardware to install a handle. This configuration has the advantage that, if the bottommost device (2901) is attached upside down, a user pulling down on the handle will only reinforce the wedging action of the top component, preventing the bottom component from becoming detached. Likewise, a user pulling up on the handle will cause the bottom component to wedge further, preventing the top component from detaching.

Other potential attaching components (2907) may include: trash can holder; storage container or box holder; light or light holder; storage cabinet holder; hook, such as for netting, a tarp, a buoy, a life preserver, or a rope; fishing pole holder; ashtray; nautical ring; mini basketball backboard holder; hose holder; electric cord holder; medicine chest holder; grab bar holder; flat screen TV holder; fan holder; net holder; rope holder; gate holder; dock cleat; chair holder; life ring holder; life-saving pole holder; life jacket holder; and so forth.

Certain exemplary embodiments of such devices (2901) having such attaching components (2907) are depicted in FIGS. 34-40. By way of example and not limitation, in the depicted embodiment of FIG. 34, the attaching element (2507) is a hardware mounting point for mounting an external device to the dock connector (2901), such as, without limitation, a trash can, storage container, and the like. Also by way of example and not limitation, in the depicted embodiment of FIG. 35, the attaching element (2507) is a set of general purpose hooks. In this embodiment, both portion (2903) and (2905) of the device (2901) comprise an attaching element (2907). Also by way of example and not limitation, in the depicted embodiment of FIG. 36, the attaching element (2907) is a hardware mounting or attaching point, such as, but not limited to, an attaching point is configured to attach a handlebar. In such an embodiment, two or more dock connectors (2901) may be used in conjunction to mount the handlebar. Also by way of example and not limitation, in the depicted embodiment of FIG. 37, the attaching element (2507) comprises a drink tray. Also by way of example and not limitation, in the depicted embodiments of FIGS. 38A and B, the attaching element (2907) comprises a fishing rod holder. Also by way of example and not limitation, in the depicted embodiment of FIG. 39, the attaching element (2907) comprises a hollow ring for holding equipment. In the depicted embodiment, the equipment is a net, but any equipment may be used. Also by way of example and not limitation, in the depicted embodiment of FIG. 40, the attaching element (2907) is a four drink tray, including a stabilizing leg (2908), which may be built into the tray (2907) or may be separately attachable, such as via hardware. In the depicted embodiment, it should be noted that the hardware is not used to attach the components (2903) and (2905) to the post.

Described herein, among other things, is an attachment system for connecting other accessories to the upright structures of a boat dock, deck or related systems, said upright structures comprising at least one post, a pair of tubular portions provided for interlocking together forming a tubular sleeve for application about the post forming the upright structure, said tubular sleeve provided for securement of other accessories thereto, to accommodate affixation of the other accessories to the post forming the upright structures for the dock or deck, and to prevent the untimely disconnection of the accessory from the post during its usage or storage.

In an embodiment of such a system, the other accessory comprised as a trash can, a fastener holding the trash can to the tubular sleeve during its application.

In an embodiment of such a system, the other accessory includes a utility cabinet, a fastener securing the utility cabinet to the tubular sleeve during application.

In an embodiment of such a system, the utility cabinet is the full height and connecting by at least a pair of tubular sleeves to the post of the upright structures for the dock or deck.

In an embodiment of such a system, a pair of tubular sleeves connecting upon the post for the upright structures of the dock or deck, and a handle for the upper and lower segments, both the upper segment and the lower segment of the handle connecting with a tubular sleeves to secure the handle to the post.

In an embodiment of such a system, the table, fasteners securing the table to the tubular sleeve for securement of the table to the post of the upright structure for the dock or deck.

In an embodiment of such a system, a series of posts forming the upright structures for the dock, at least one tubular sleeve connecting proximate the upper ends of the post, the tubular sleeve having an anchor connecting therewith, and a covering means securement with the sleeve anchors to provide an overhead covering for the dock during its usage.

In an embodiment of such a system, the tubular sleeve mounts upon the post, the tubular sleeve having a holder connected therewith, and the holder provided for securement of a flag upon the upright structure of the dock or deck.

In an embodiment of such a system, the tubular sleeve is affixed to the post of the upright structure, a holder connecting with the tubular sleeve, and provided for supporting a fishing rod upon the dock during its usage.

In an embodiment of such a system, at least one annulus provided for interconnecting with at least one tubular sleeve, and the annulus extending inwardly over the dock from the upright post, and the annulus provided for storing swimming accessories such as noodles during their non-usage.

In an embodiment of such a system, a pair of tubular sleeves mounting upon the post of the upright structure, and a boat bumper attaching with each sleeve for extending downwardly along the sides of the dock within a boat slip to protect any boat against contact with the dock while moored.

In an embodiment of such a system, at least one eyelet interconnecting with the upper tubular sleeve, and the eyelet extending inwardly over the boat bumper and provided for attachment of the boat mooring rope to the dock during non-usage.

In an embodiment of such a system, the interconnection between a pair of sleeve portions includes a tongue and groove interconnection for attachment of the tubular sleeve about the post of the upright structure.

In an embodiment of such system, the interconnection between the sleeve portions includes a ball and socket interconnection for securement of the sleeve portions into the tubular sleeve for attachment about the post of the upright structure.

In an embodiment of such system, the sleeve portions include a T-groove integrally formed therewith, to provide for the securement of the sleeve portions into the tubular sleeve for attachment about the post of the upright structure.

In an embodiment of such system, the stop provided at the bottom of at least one tubular portion to align the tubular portions together when assembled for forming the tubular sleeve for attachment about the post of the upright structure.

In an embodiment of such system, the tongue and grove interconnection between the tubular portions ends upwardly from the bottom of each sleeve portion, to provide for alignment of the connected tubular portions together when forming the tubular sleeve for the post of the upright structure.

Throughout this disclosure, relative terms such as "generally," "about," and "approximately" may be used, such as, but not necessarily limited to, with respect to shapes, sizes, dimensions, angles, and distances. One of ordinary skill will understand that, in the context of this disclosure, these terms are used to describe a recognizable attempt to conform a device to the qualified term. By way of example and not limitation, components described as being "generally coplanar" will be recognized by one of ordinary skill in the art to not be, in a strict geometric sense, coplanar, because a "plane" is a purely geometric construct that does not actually exist, and no component is truly "planer" in the geometric sense, nor are two components ever truly coplanar. Variations from geometric descriptions are inescapable due to, among other things: manufacturing tolerances resulting in shape variations, defects, and imperfections; non-uniform thermal expansion; and natural wear. There exists for every object a level of magnification at which geometric descriptors no longer apply due to the nature of matter. One of ordinary skill will understand how to apply relative terms such as "generally," "about," and "approximately" to describe a range of variations from the literal meaning of the qualified term in view of these and other considerations.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A sleeve comprising:
 a sleeve portion comprising:
  a generally U-shaped top surface comprising a base side and two legs attached generally perpendicularly to opposing ends thereof, each of said legs terminating in a generally J-shaped interlocking portion comprising a hook protruding laterally outward of said U-shape, said each hook portion terminating at a terminal end spaced from said each leg and defining a space between said leg and said terminal end;
  a bottom surface opposing and in generally the same configuration as said top surface;
  a body extending generally perpendicularly between said top surface and said bottom surface and having a thickness and a height;
  wherein at said each terminating end, said thickness of said body is tapered from said top surface to said bottom surface;
 a mating portion comprising:
  a generally U-shaped top surface comprising a base side and two legs attached generally perpendicularly to opposing ends thereof, each of said legs terminating in a generally G-shaped interlocking portion protruding laterally outward of said U-shape and comprising:
   an arm attached to said each leg, said arm extending laterally outwardly from said U-shape;
   a hook attached to said arm, said hook terminating at a terminating end extending inwardly toward said U-shape and disposed laterally outward of said each leg;
  a bottom surface opposing and generally in the same configuration as said top surface;
  a body extending between said top surface and said bottom surface and having a thickness and a height;
   wherein said each G-shaped interlocking portion is sized and shaped to define a space configured to accommodate said each terminal end of said each J-shaped interlocking portion;
 wherein when each said terminal end of said sleeve portion is inserted into said each defined space of said each G-shaped interlocking portion, said sleeve portion and said mating portion form an assembled sleeve having a generally planar top surface and an opposing generally planar bottom surface; and
 wherein said sleeve portion comprises a base wall defined by the portion of said body extending between said top surface and said bottom surface at said base of said U-shape, said base wall having a front side disposed between said legs and an opposing back side, said base wall having attached thereto an attaching element.

2. The sleeve of claim 1, wherein said attaching element is configured to hold a nautical rope.

3. The sleeve of claim 1, wherein said attaching element comprises a plurality of hardware mounting points disposed on said attaching element to accommodate the mounting of a handlebar to said attaching element.

4. The sleeve of claim 1, wherein said attaching element comprises a fishing rod holder.

5. The sleeve of claim 1, wherein said attaching element is selected from the group consisting of: a trash can holder; a storage container holder; a light; a light holder; a hook; a ring; an eyelet; a basketball backboard; a hose holder; an electrical cable holder; a television mounting bracket; an electrical fan holder; a mounting bracket for a gate; a life jacket holder; a life ring holder; and a dock cleat.

* * * * *